United States Patent [19]
Aoki

[11] Patent Number: 5,350,151
[45] Date of Patent: Sep. 27, 1994

[54] LOAD SUPPORTING APPARATUS

[75] Inventor: Satoshi Aoki, Kadoma, Japan

[73] Assignee: Matsushita Electric Industrial Co., Ltd., Kadoma, Japan

[21] Appl. No.: 959,909

[22] Filed: Oct. 13, 1992

[30] Foreign Application Priority Data

Dec. 9, 1991 [JP] Japan .................. 3-324206

[51] Int. Cl.$^5$ ............................................. F16M 11/00
[52] U.S. Cl. ................... 248/615; 248/188.3; 248/677
[58] Field of Search ............ 248/615, 677, 678, 188.2, 248/188.3, 188.8

[56] References Cited

U.S. PATENT DOCUMENTS

| | | | |
|---|---|---|---|
| 2,359,000 | 9/1944 | Rosenzweig | 248/677 |
| 2,553,269 | 5/1951 | Oldofredi | 248/615 |
| 2,683,576 | 7/1954 | Miller | 248/677 |
| 2,704,663 | 3/1955 | Blake | 248/615 |
| 3,025,557 | 3/1962 | Knowlton | 248/615 |
| 4,257,618 | 3/1981 | Tax et al. | 248/188.3 |

FOREIGN PATENT DOCUMENTS

| | | |
|---|---|---|
| 58-125467 | 8/1983 | Japan . |
| 59-94482 | 6/1984 | Japan . |
| 62-70478 | 5/1987 | Japan . |
| 2126478 | 10/1990 | Japan . |
| 458904 | 2/1992 | Japan . |

Primary Examiner—Eugenia Jones
Assistant Examiner—Hwei-Siu Payer
Attorney, Agent, or Firm—Cushman, Darby & Cushman

[57] ABSTRACT

Load such as a large screen TV set is supported with improved stability without losing mobility, by providing resilient members such as compression springs between the supporting flat base whereon the TV set is mounted and plural load supporting bodies which are rollers held vertically movable to some extent. When a strong outside force is applied, for instance, the TV set is strongly pushed from its back, the front rollers are retracted by compression of the spring, thereby the front bottom edge of the console touches the floor and resisting force or reaction force against the fall down of the TV set much increases.

10 Claims, 20 Drawing Sheets

LOAD SUPPORTING APPARATUS

FIELD OF THE INVENTION

The present invention relates to a load supporting apparatus for a television set console or the like load.

DESCRIPTION OF THE RELATED ART

In recent years, in the development of audiovisual apparatus including television set, in order to pursue the comfortableness of actual individual life, efforts have been made for minimizing the space occupied by those audio-visual apparatus (e.g. television set) in the living environment. Therefore, many sets which were small in depth dimension and looked smart in design have been developed.

However, in proportion to the decrease of the depth dimension, stability on setting those apparatus on the floor became impaired, and it often happens that even a small force can bring an apparatus being fallen down on the floor. In particular, accidents of falling-down of the audio visual apparatus toward the front side on the floor became increasing and it is dangerous.

In the following, explanation is given on a conventional method of the load supporting for a television set referring to FIG. 18 to FIG. 21. FIG. 18 shows the outline of the positional relation between a television set and load supporting device by a cross-sectional drawing of its main part. As shown in the figures, load supporting body 102A and 102B are provided in the television set 101.

FIG. 19 shows the relation of reaction forces produced on the front load supporting body 102A and the back load supporting body 102B, a distance X, which is from a point A of a contact point of the front supporting device (castor roller) 102A on the floor to the point of crossing of a vertical line passing the center of gravity CG with the floor, and other distances and forces and reaction forces. Mark F designates a horizontal external force which causes the fall-down of the load, e.g., a television set depending on its amount. Mark CG designates the center of gravity, W is a weight of the television set 101 as the load. $Ra$ and $\mu.Ra$ are respectively vertical and horizontal reaction forces at the floor contact points of the load supporting device 102A. $Rb$ and $\mu.Rb$ are respectively vertical and horizontal reaction forces at tile floor contact points of the load supporting device 102B. Marks X and Y are respectively horizontal and vertical distances from the floor contact point of the front load supporting device 102A to the center of gravity CG. Mark P designates a distance between the floor contact points of the front load supporting device 102A and the back load supporting device 102B. H is a vertical distance from the floor to the force acting point at which the fall-down force F acts. Among respective forces and distances, the following relations hold:

$$W = Ra + Rb,$$

$$F.H + Rb.P - W.X = 0.$$

By rearranging the equations, $Ra$ can be expressed as $Ra = \{(P-X)W + FH\}/P$. Then $Rb$ can be expressed as $Rb = (WX - FH)/P$. Since $Rb$ becomes zero at a time when the television set 101 is going to fall down, by substituting zero into $Rb$ in the equation $Rb = (WX - FH)/P$, F is obtained to be $F = W.X/It$. An external force F at this time of $Rb = 0$, i.e., $F = W.X/H$, is now defined as "critical fall-down force" $F_f$. That is, $F_f = W.X/H$. For a given particular television set or the like load, it is understood that, for increasing the critical fall-down force $F_f$, it is necessary to increase the horizontal distance X between the center of gravity and the front load supporting body 102A.

Consequently, heretofore the fall-down accident has been excluded by placing an additional load supporting body 102C at a front position of the television set 101 as close to the front end as possible as shown in FIG. 20, or by fixing the television set 101 to the wall of the building by using a chain or the like measure, as shown in FIG. 21. And, for example, as was disclosed in Japanese patent unexamined publication 58904/1992 (Tokkai Hei 458904), there was a method to obtain a stable setting state by attaching castors to the television set at a time of moving a television set, followed by a step of storing the castors in a rack in the main body by using tools at a time of setting (i.g., after moving) the television set.

By such the conventional method as has been stated above, however, there were problems such that, because of the necessity of placing the load supporting device at the front side of the television set, restriction was posed on the designing of the cabinet, or the location of setting of the television set was limited to places that were close to strong parts of the building. Besides, in the case of Tokkai Hei 4-58904, manual labor and tools were necessary to lift up or put down the castors.

OBJECT AND SUMMARY OF THE INVENTION

In view of the problem described above, the present invention purposes to increase the "critical fall-down force" $F_f$ without suffering from any restriction on the setting location and the cabinet design. The present invention intends to achieve this purpose by changing, depending on the variation of the load to be acted, the distance between the set main device and the setting plane. Thereby the setting position of the set main body is moved to a most favorable position to avoid the fall-down of the set.

In order to achieve the purpose described above, a load supporting apparatus in accordance with the present invention comprises:

a supporting base on which an objective set is fixedly mounted, plural load supporting bodies which are installed in a manner vertically movable on the supporting base, and resilient members provided between each of load supporting bodies and the supporting base, which permits the load supporting bodies to retract to a certain extent into the supporting base when a force which acts on the supporting base exceeds a predetermined amount, thereby increasing an angle ($\theta_1$) formed between a vertical line and an oblique line connecting between the center of gravity (CG) of the objective set and a floor touching point (A or C) of the supporting base to the floor.

According to the load supporting method of a television set of the present invention, by providing a supporting base to bear a television set thereon, with a vertically movable load supporting body and an elastic element between the load supporting body and the supporting base, the load supporting body is moved into the above-mentioned supporting base when an external force to the load or the television set is acted. When a force acting on the above-mentioned supporting base reaches a certain predetermined value, the angle formed at the center of gravity between the vertical line and a line to the touching point of the supporting base to the floor varies, and hence the horizontal distance between the center of gravity and the floor touching point becomes long. Thereby the critical fall-down force can be increased without suffering from the restriction of the setting place or of the design. Therefore, it becomes possible to aim at far more stable supporting of the load such as the television set console box.

While the novel features of the invention are set forth particularly in the appended claims, the invention, both as to organization and content, will be better understood and appreciated, along with other objects and features thereof, from the following detailed description taken in conjunction with the drawings.

Figure 5A:
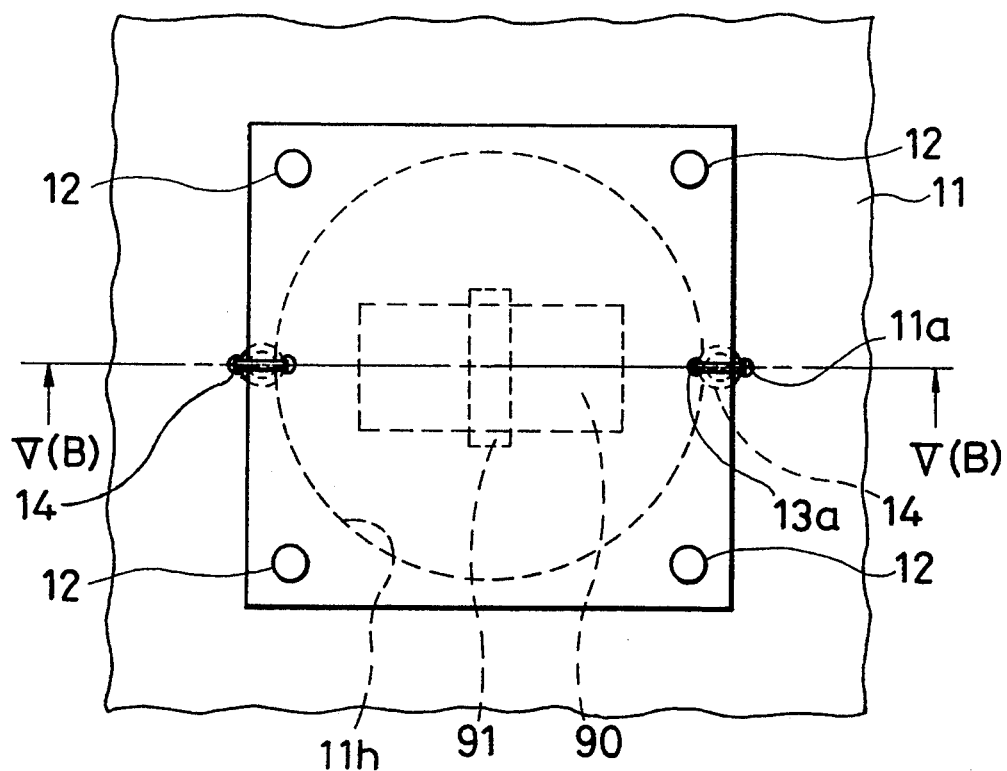
FIG. 5(A) is a plan view of a load supporting apparatus in a second working example of the present invention.

FIG. (6) is a cross-sectional side view of FIG. 5(A) seen from the cutting line V(B)—V(B), when the action by load is applied.

Figure 7A:
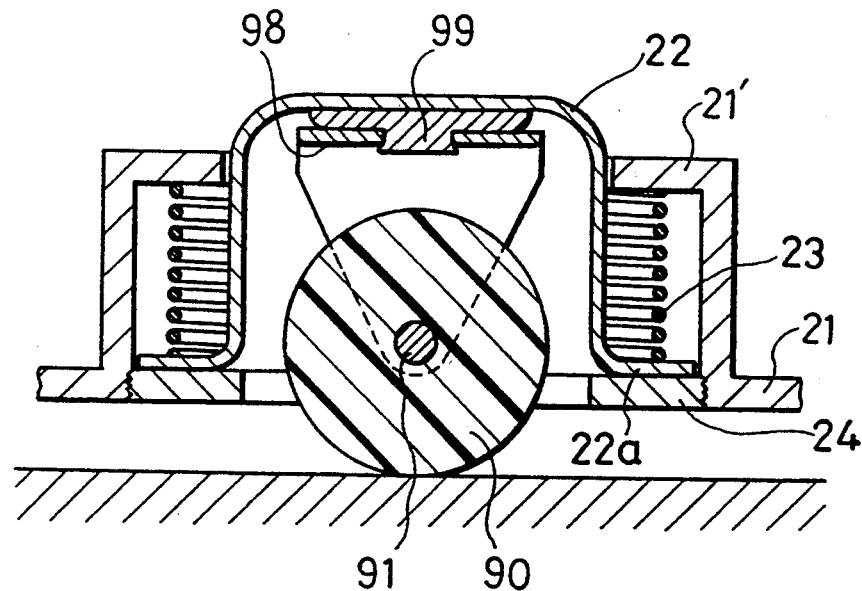
Figure 7B:
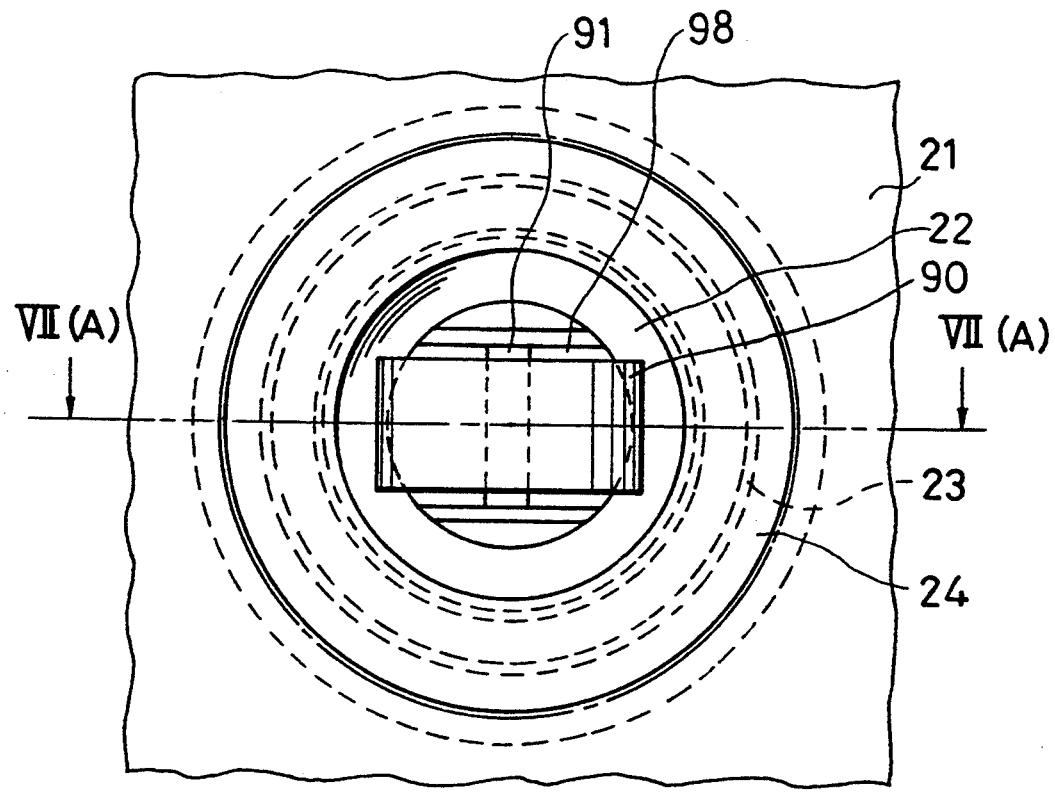

FIG. 7(A) is a cross-sectional side view of FIG. 7(B) seen from a cutting line VII(A)—VII(A) at the time before the action by load is applied.

FIG. 7(B) is a plan view of a load supporting device of a third working example of the present invention.

Figure 8A:
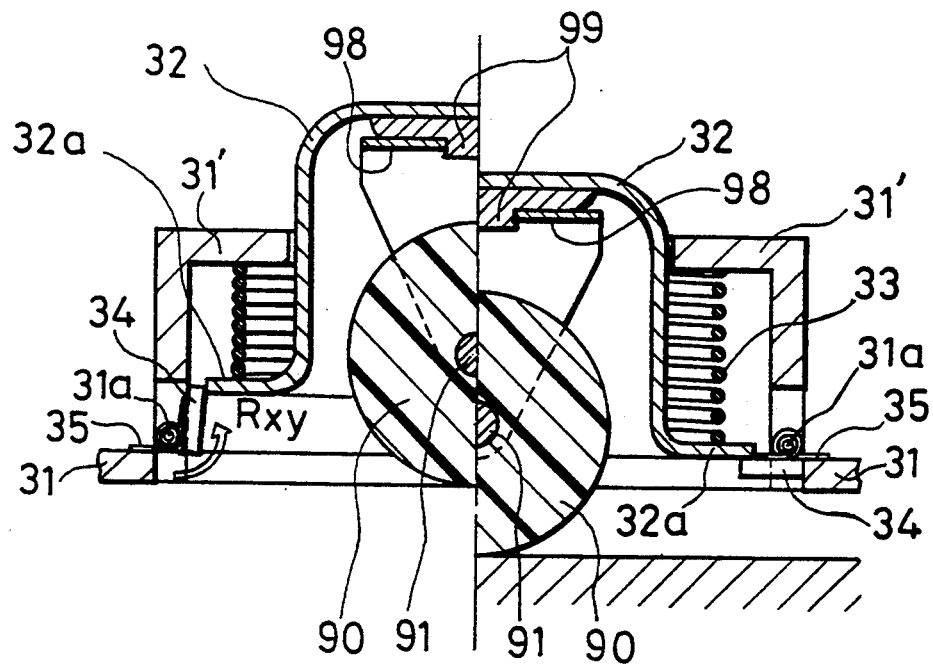

FIG. 8(A) is a composite cross-sectional side view of a fourth working example of the present invention, wherein left half part shows an assembly step, and the right half part shows the state when the load is acting.

Figure 8B:
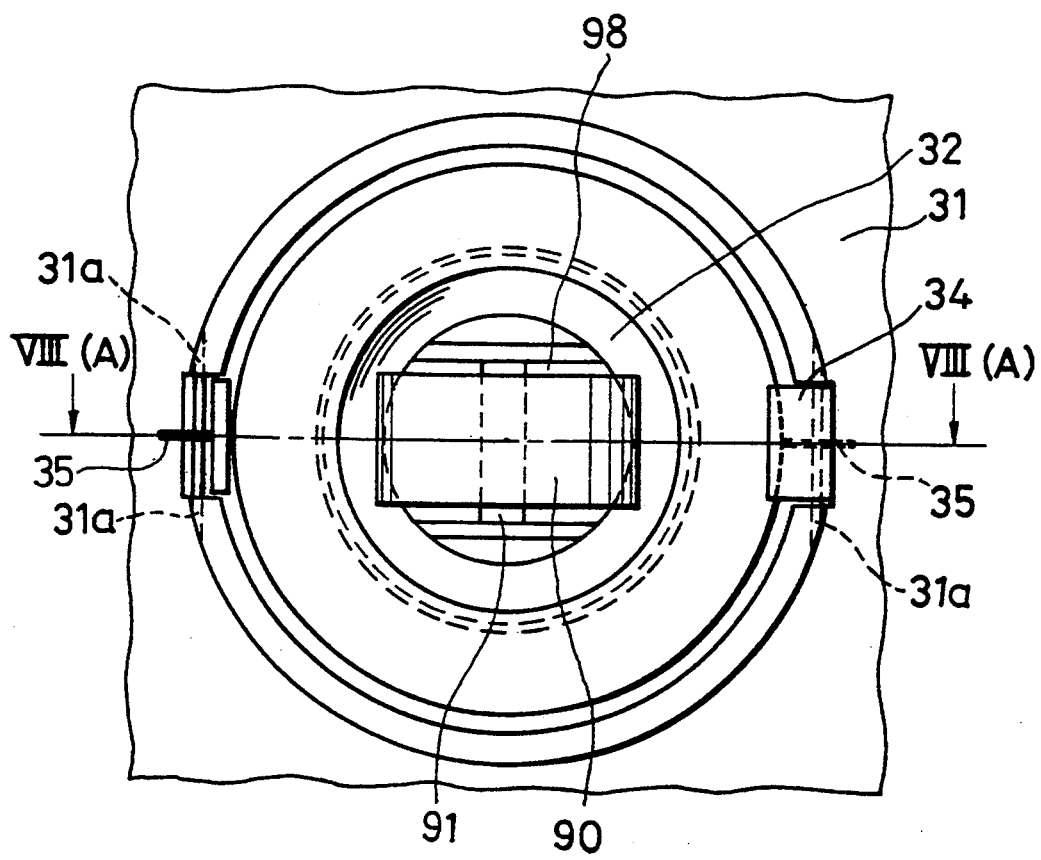

FIG. 8(B) is a plan view of a load supporting device of a forth working example of the present invention.

Figure 9A:
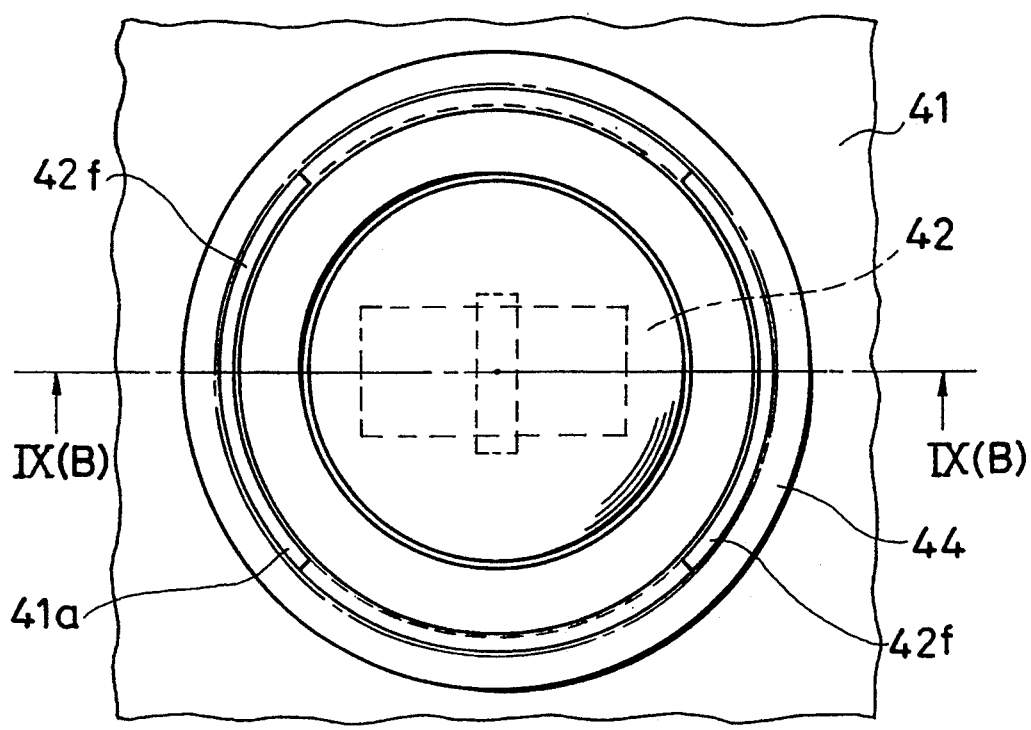

FIG. 9(A) is a plan view of a load supporting apparatus in a fifth working example of the present invention.

Figure 9B:
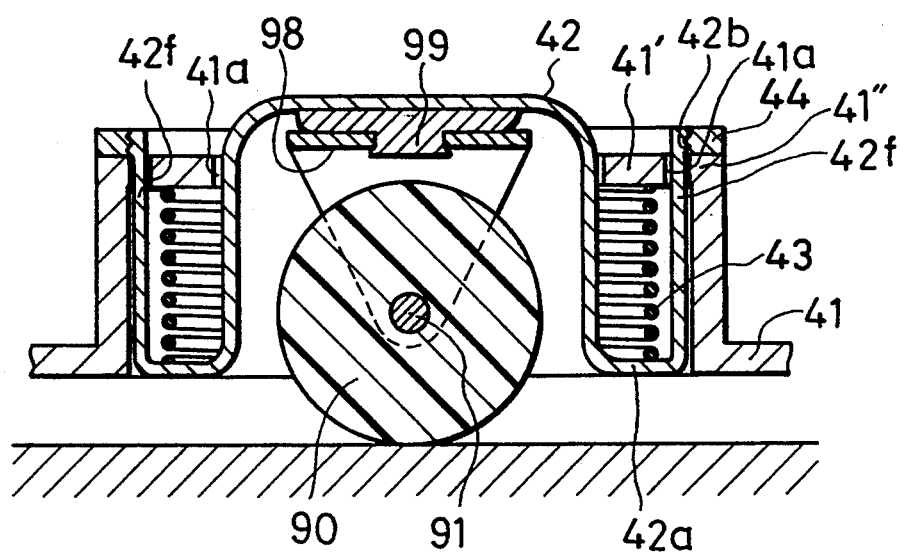

FIG. 9(B) is a cross-sectional side view seen from a cutout plane IX(B)—IX(B) in FIG. 9(A) when no load is acting.

Figure 10A:
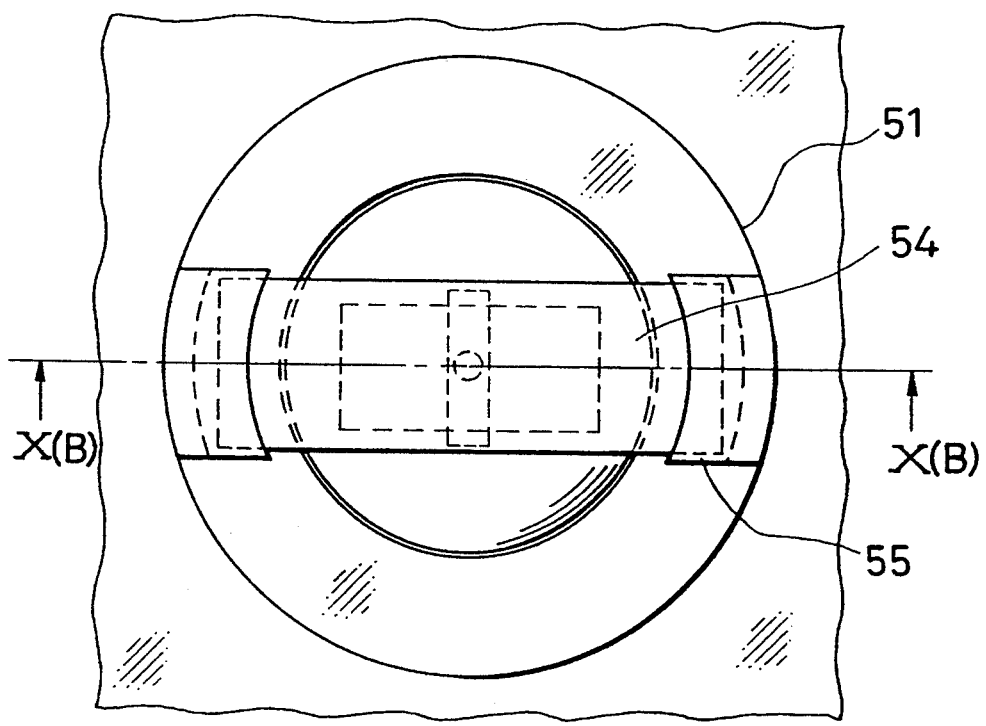

FIG. 10(A) is a plan view of a load supporting apparatus in a sixth working example of the present invention.

Figure 10B:
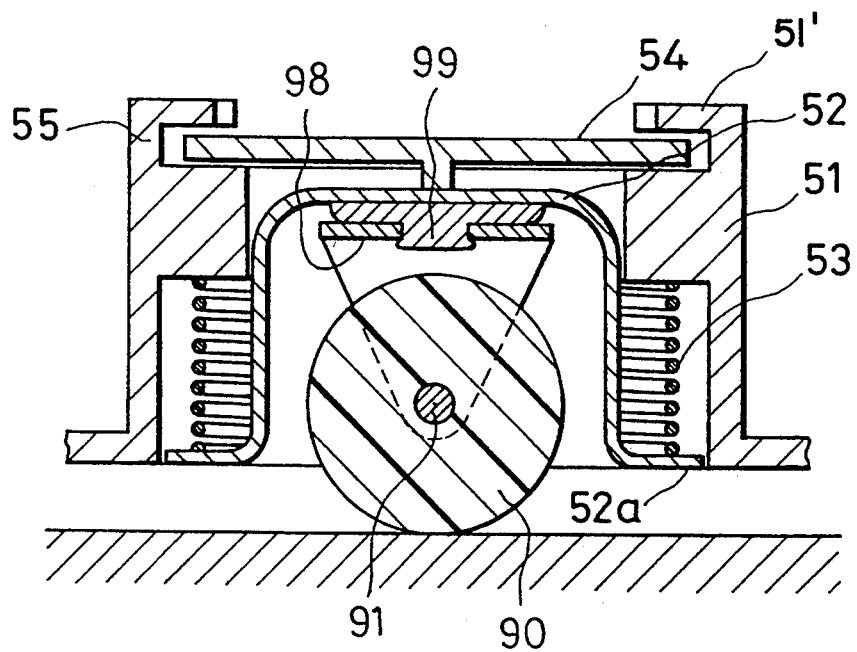

FIG. 10(B) is a cross-sectional side view seen from a cutout plane X(B)—X(B) in FIG. 10(A) when no load is acting.

Figure 11A:
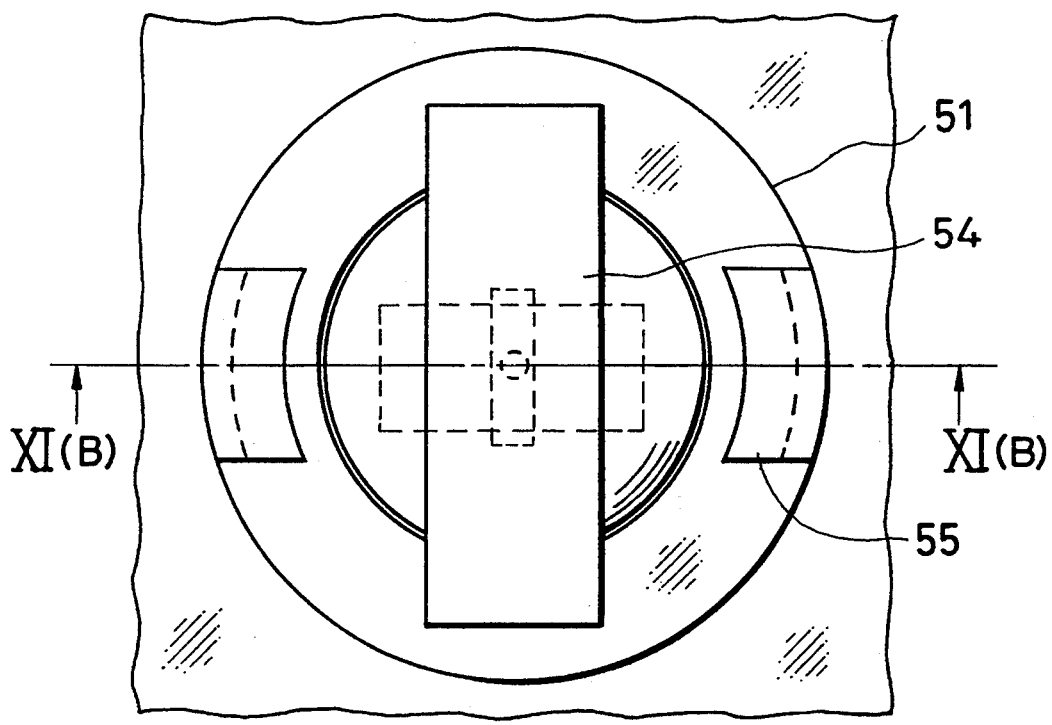

FIG. 11(A) is a plan view of the load supporting device of a the sixth working example of the present invention.

Figure 11B:
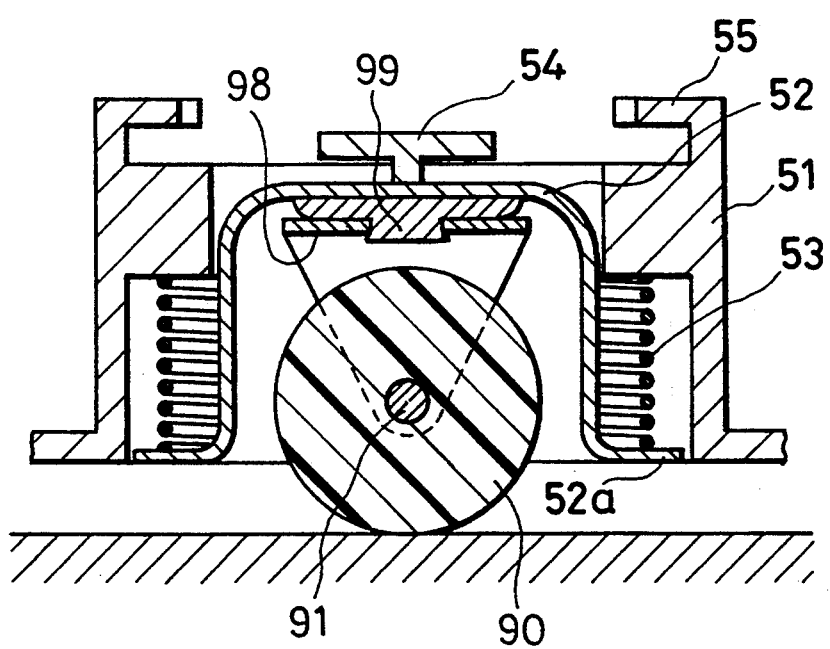

FIG. 11(B) is a cross-sectional side view of FIG. 11(A) seen from a cutting line XI(B)—XI(B) at the time before the action by load.

Figure 12A:
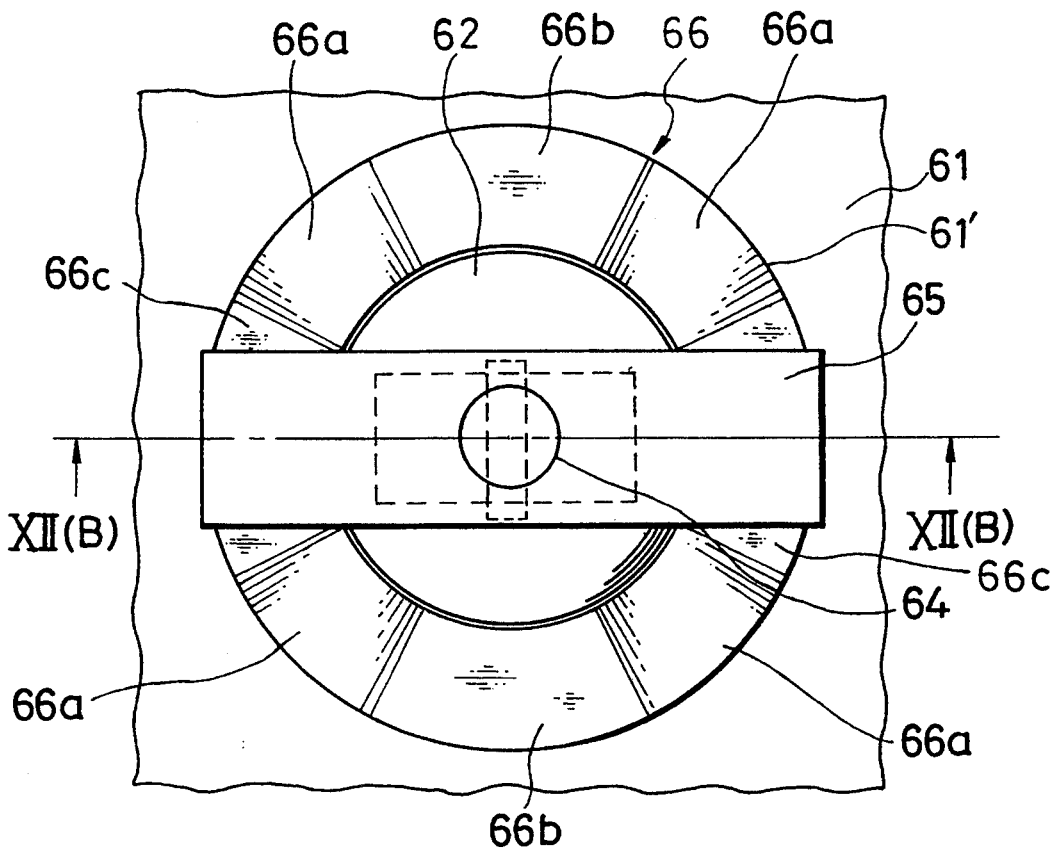

FIG. 12(A) is a plan view of a load supporting apparatus in a seventh working example of the present invention.

Figure 12B:
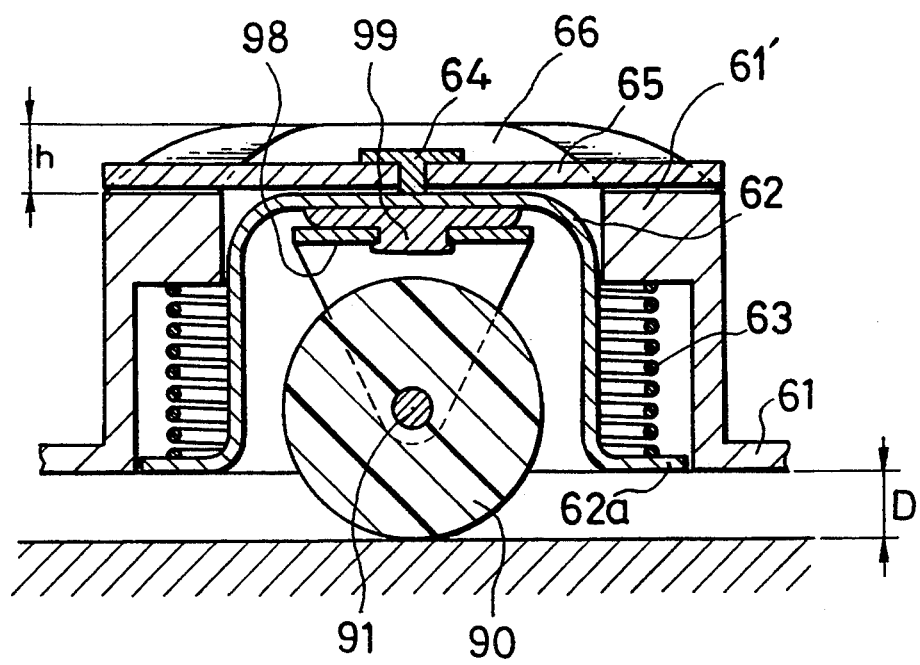

FIG. 12(B) is a cross-sectional side view of FIG. 12(A) seen from a cutting line XII(B)—XII(B) at the time before the action by load is applied.

Figure 13A:
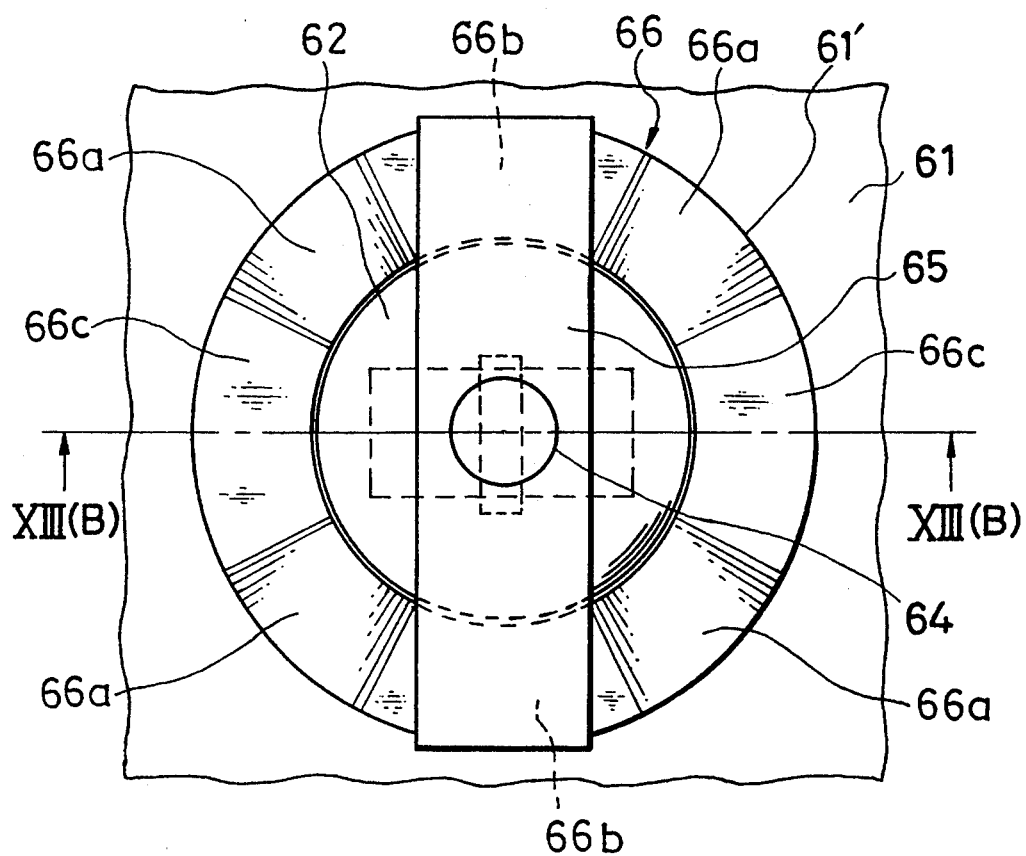

FIG. 13(A) is a plan view of the load supporting device of the seventh working example of the present invention when the cam-engage lever 65 is on high parts 66b of the end-plane cam 66.

Figure 13B:
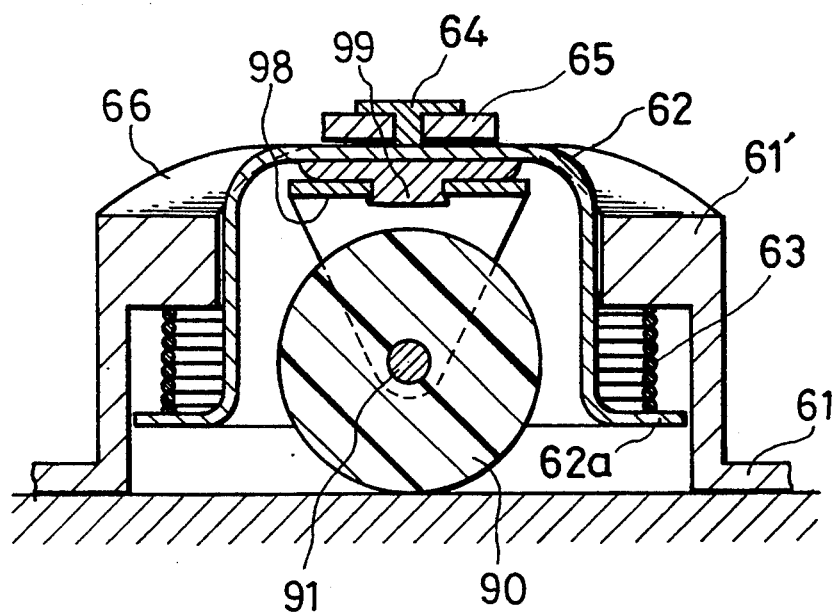

FIG. 13(B) is a cross-sectional side view of FIG. 13(A) seen from a cutting line XIII(B)—XIII(B), where the roller 90 is retracted up.

Figure 14A:
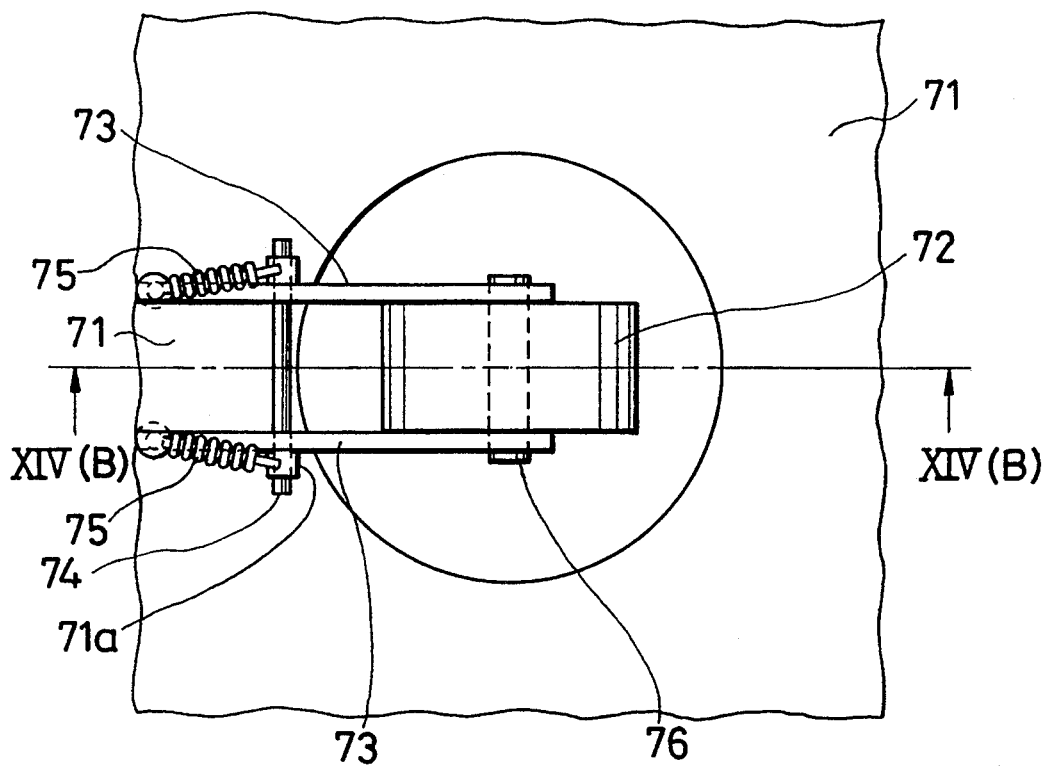

FIG. 14(A) is a plan view of a load supporting apparatus in an eighth working example of the present invention.

Figure 14B:
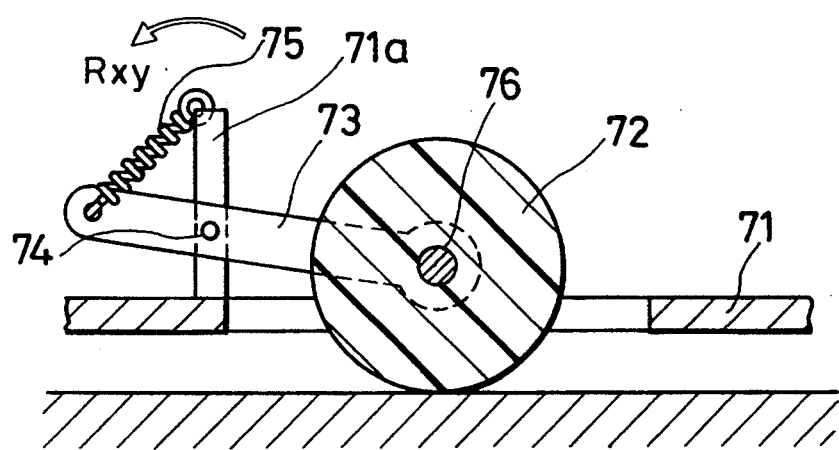

FIG. 14(B) is a cross-sectional side view seen from a cutout plane XIV(B)—XIV(B) in FIG. 14(A) when no load is acting.

Figure 15:
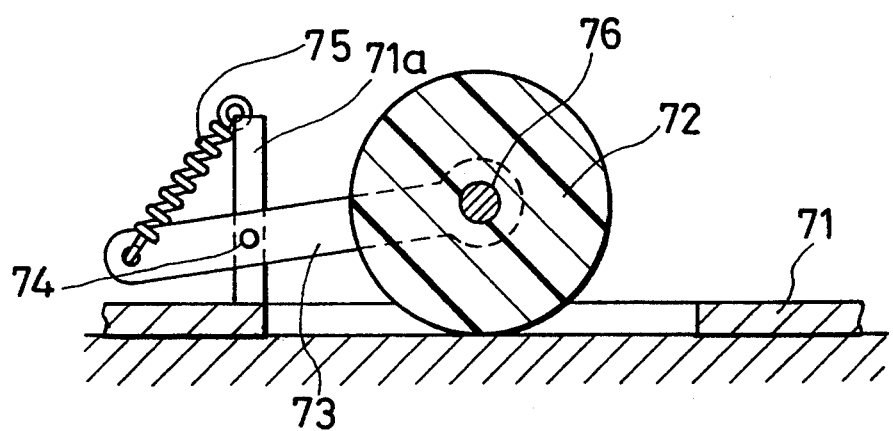

FIG. 15 is similar cross-sectional side view with that of FIG. 14(B) but showing the status when the load is acting.

Figure 16:
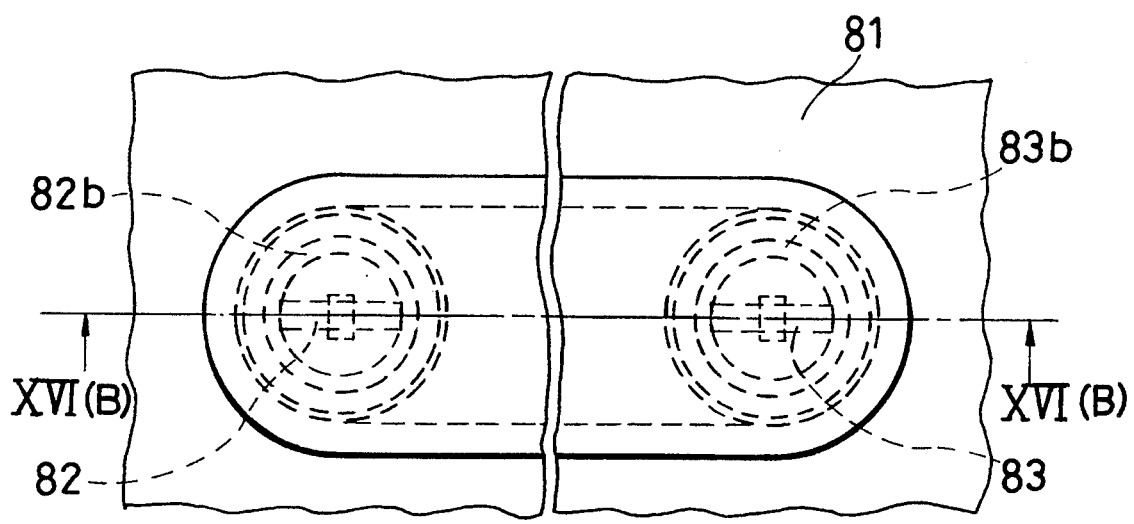
Figure 16:
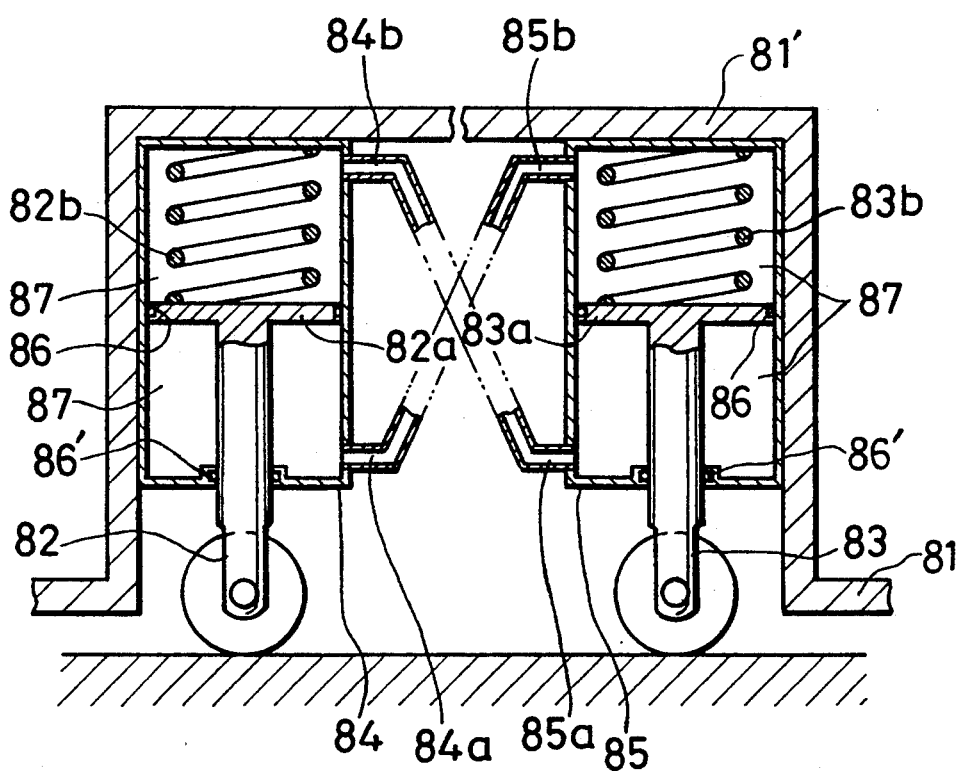

FIG. 16(A) is a plan view of a load supporting apparatus in a ninth working example of the present invention.

FIG. 16(B) is a cross-sectional side view seen from a cutout plane XVI(B)—XVI(B) in FIG. 16(A) when no load is acting.

Figure 17:
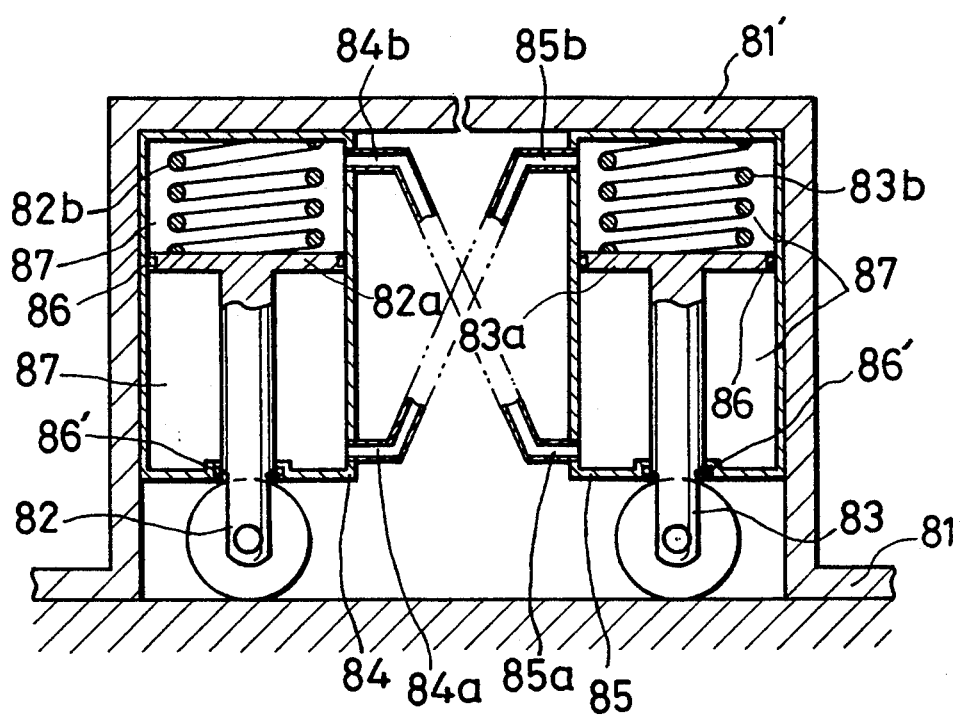

FIG. 17 is the similar cross-sectional side view with that of FIG. 16(B) but showing the status when the load is applied.

Figure 18:
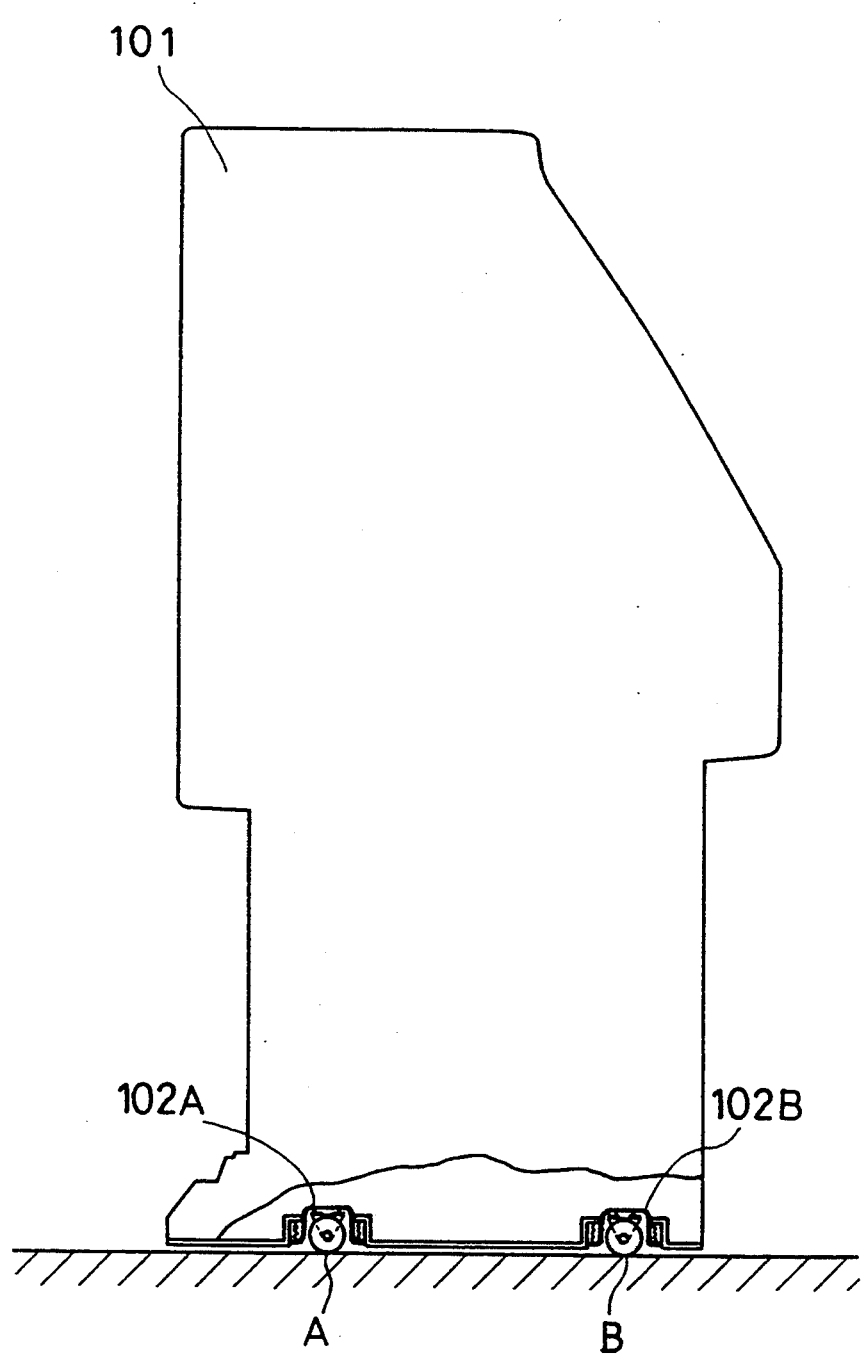

FIG. 18 is the outline side view of the conventional TV set having front rollers and back rollers.

Figure 19:
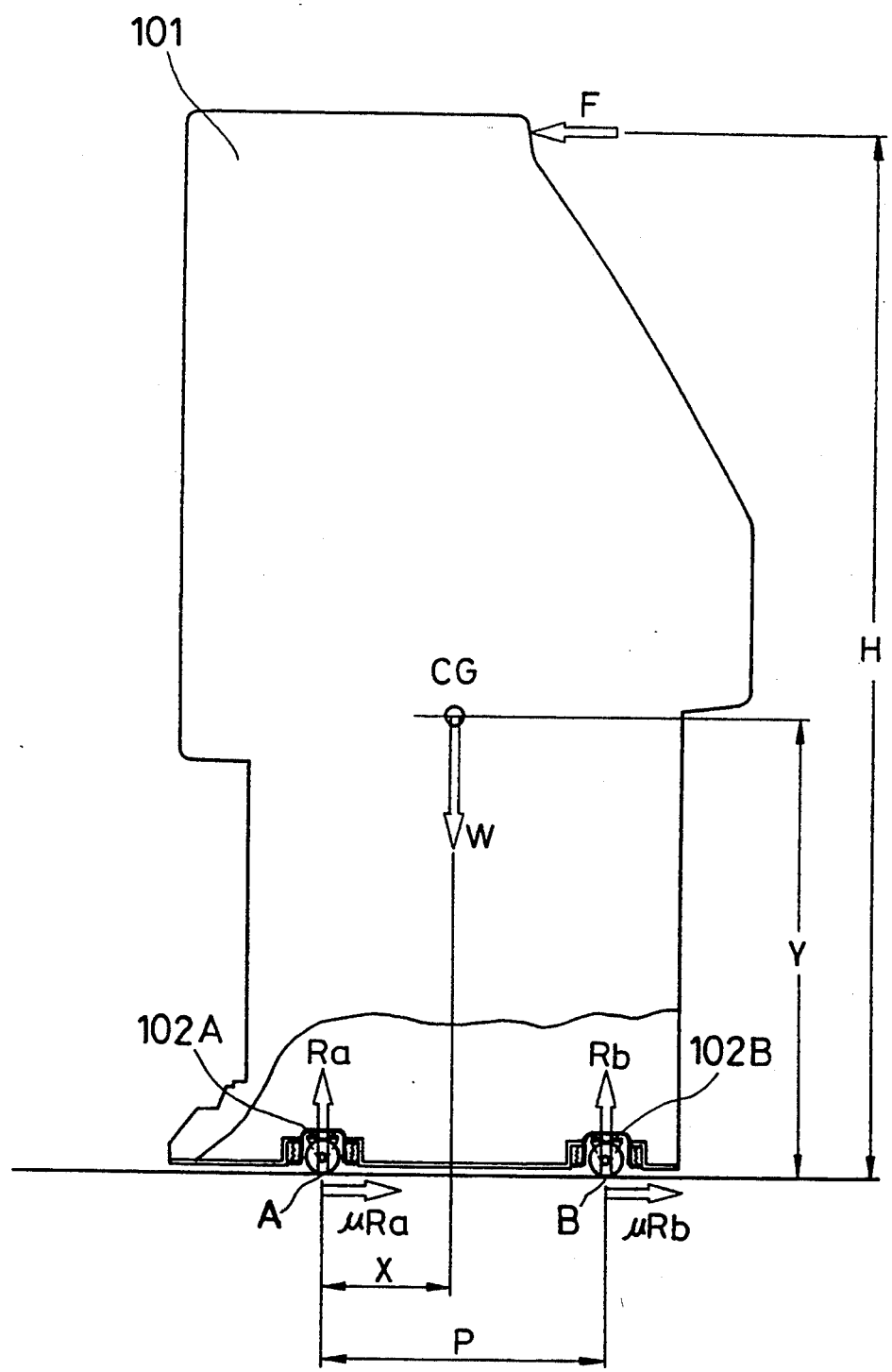

FIG. 19 is the outline side view of the conventional TV set elucidating relation of various dimensions, center of gravity point, points of supporting the TV set, weight, external force at the back of the TV set to move it, and reactions at the points of supporting.

Figure 20:
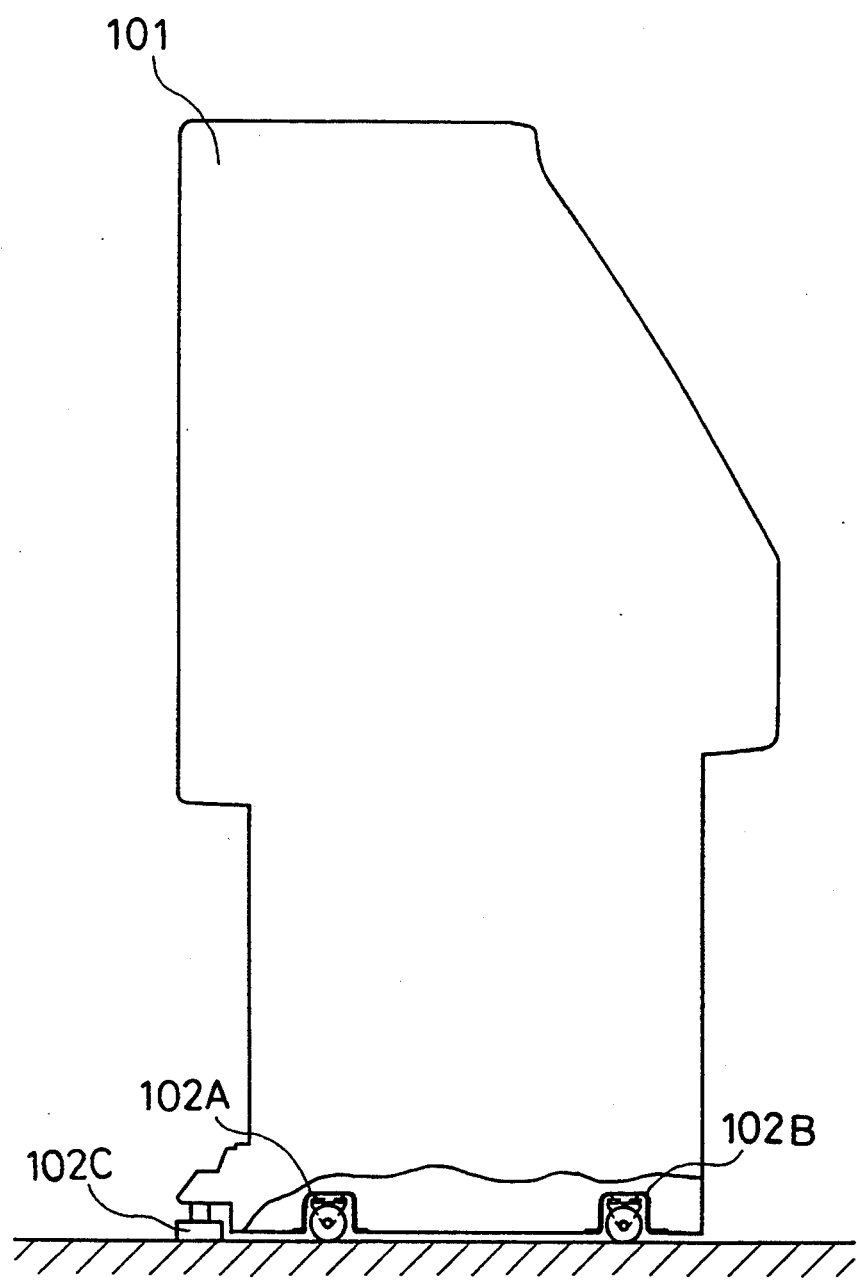

FIG. 20 is the outline side view of the conventional measure to protect the TV set from its falling down.

Figure 21:
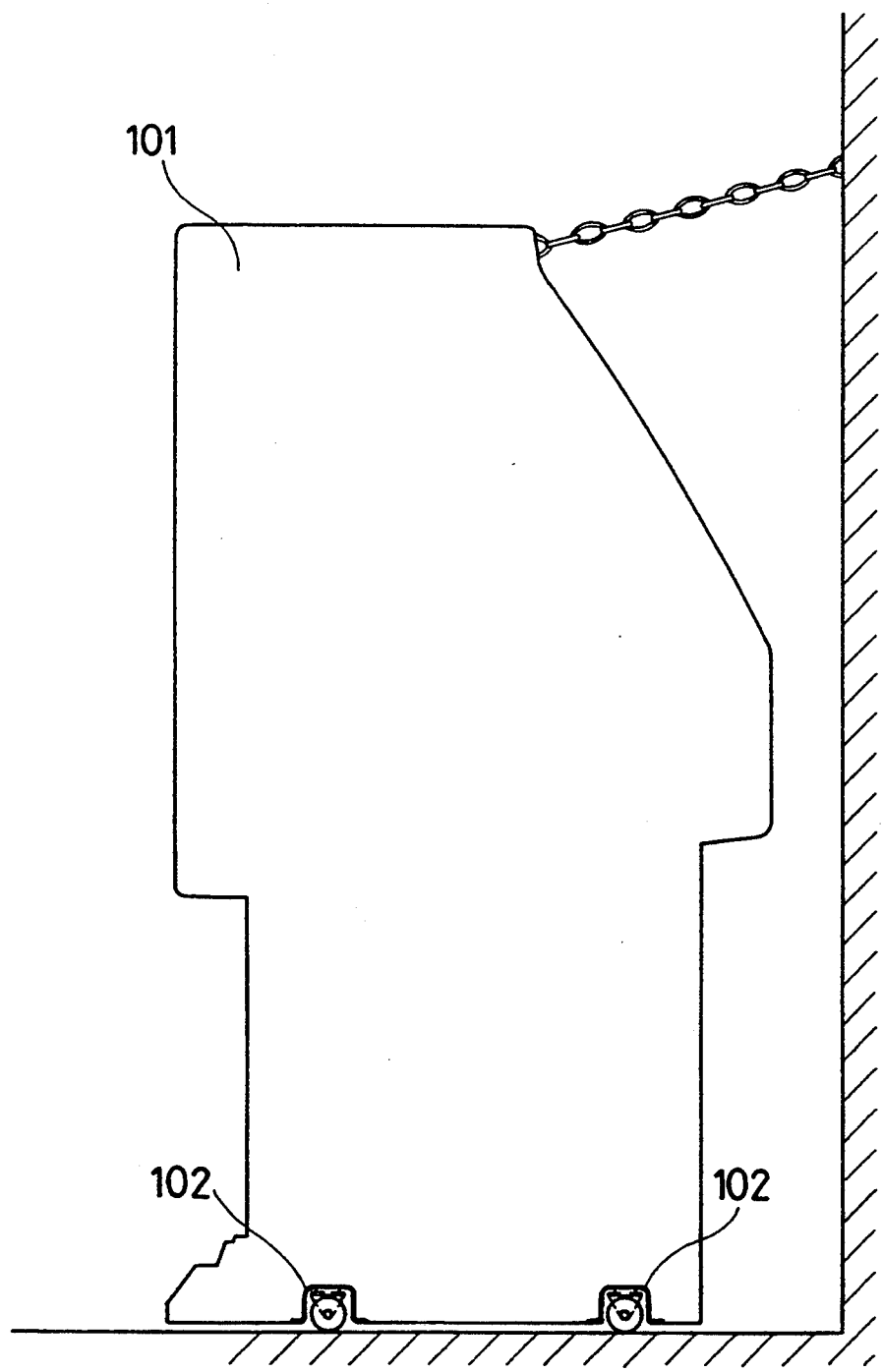

FIG. 21 is tile outline side view of the other conventional measure to protect the TV set from its falling down.

DESCRIPTION OF THE PREFERRED EMBODIMENT

In the following, explanations are given on working examples of the present invention referring to FIG. 1 to FIG. 17.

[First Working Example]

Figure 1A:
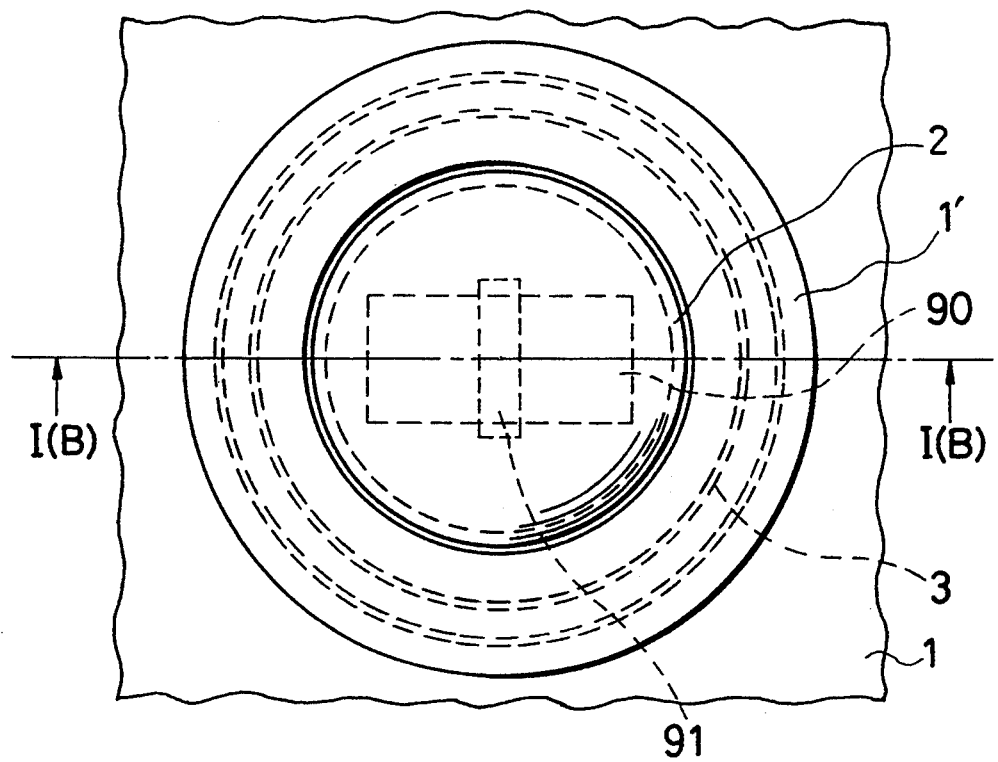
FIG. 1(A) is a plan view of a load supporting apparatus of a working example of the present invention.
Figure 1B:
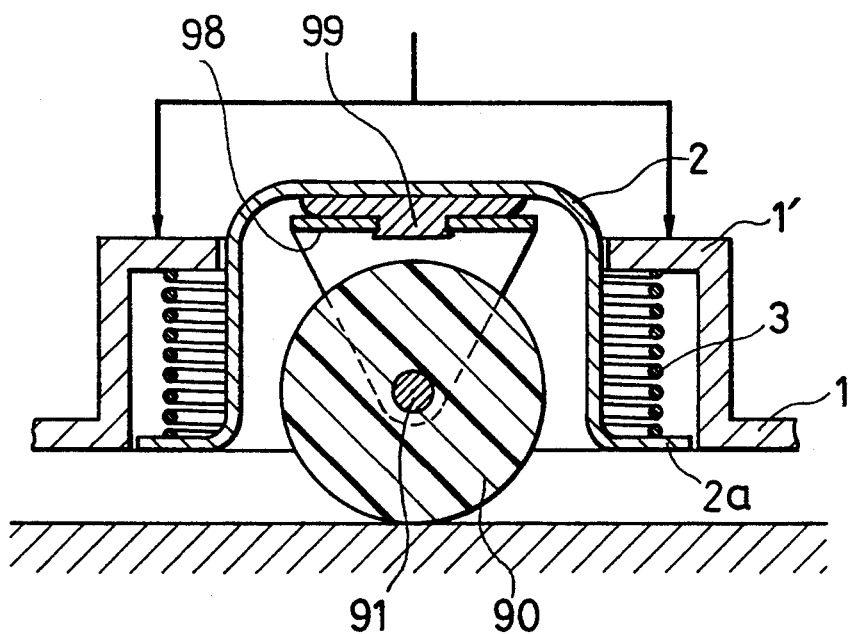
FIG. 1(B) is a cross-sectional side view of FIG. 1(A) seen from a cutting line I(B)—I(B) at the time before the action by load is applied.
Figure 2:
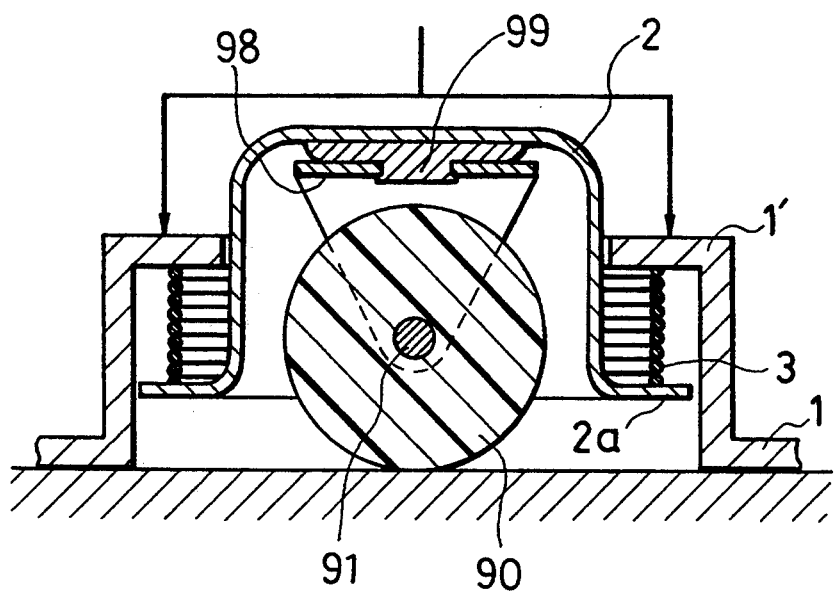
FIG. 2 is a cross-sectional side view of FIG. 1(A) seen from the cutting line I(B)—I(B) when the action by load is applied.
Figure 3:
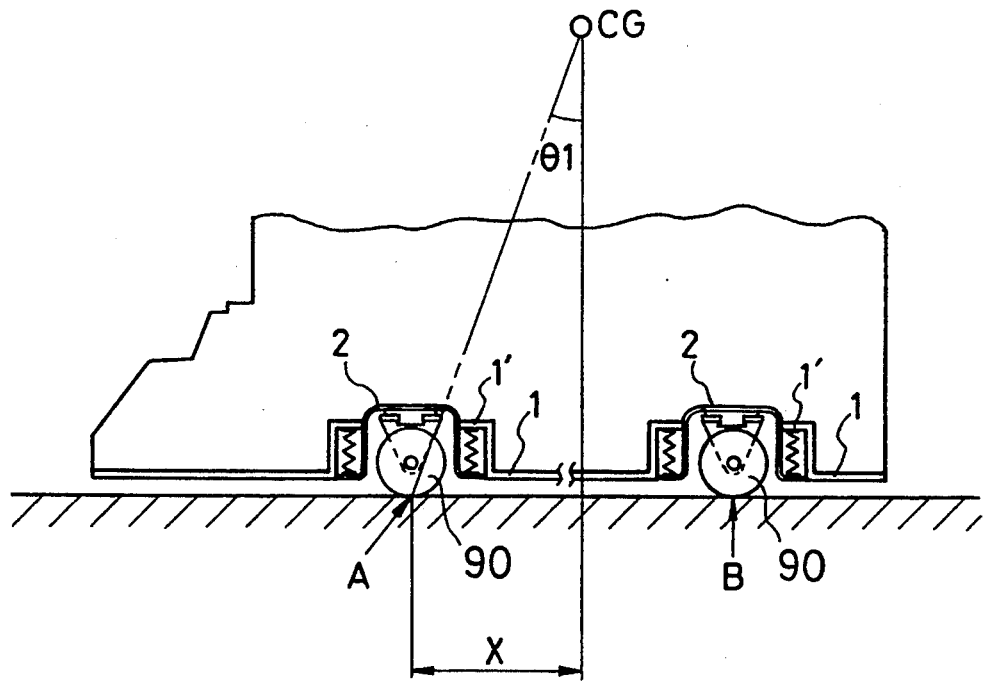
FIG. 3 is a cross-sectional view of the outlined main part of the apparatus including a lower part of the television set when the load is not acting.
Figure 4:
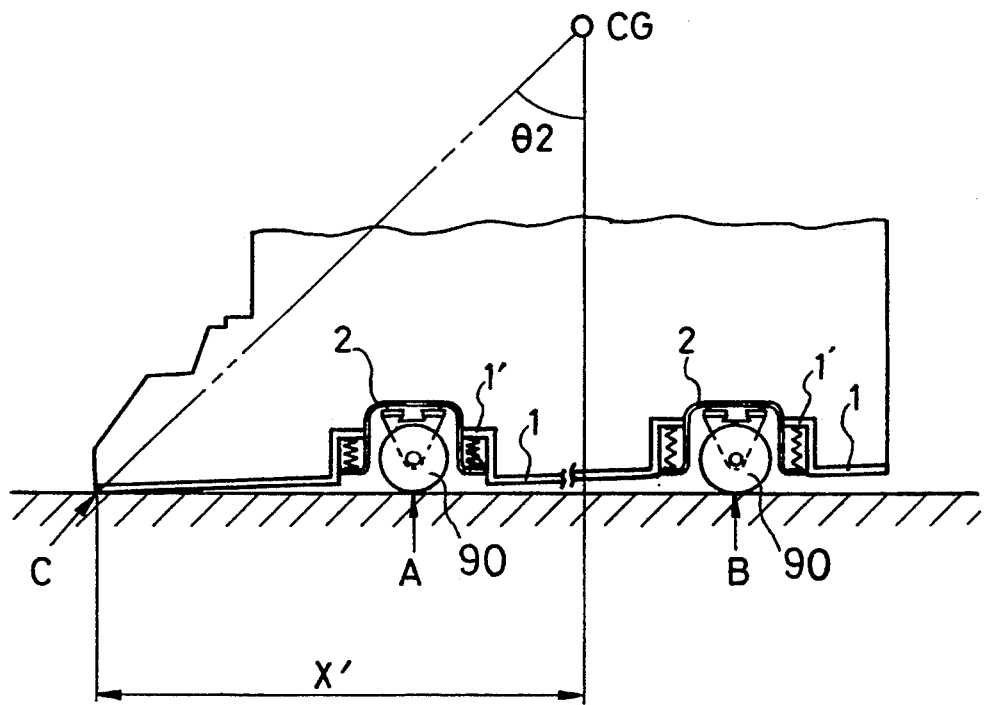
FIG. 4 is the similar view when the load is acting.

In FIG. 1(A) which is a plan view and FIG. 1(B) which is a cross-sectional side view seen from a cutout plane I(B)—I(B) in FIG. 1(A), a load supporting apparatus of a first working example of the present invention is shown. FIG. 2 is a drawing which shows the status of apparatus of FIG. 1 when the load is acting. FIG. 3 is a cross-sectional view of the outlined main part including a television set when the load is not acting, and FIG. 4 is the similar view when the load is acting.

As shown in FIG. 1(A) and FIG. 1(B), a supporting base 1 of a rigid plate has generally four raised parts 1' each with a round hole at its top part and bears the television set on its flat part. Each load supporting body 2 which is formed in a shape of an inverted cup with a flange 2a at the opening is disposed in the round holes provided on the supporting base 1 in a manner movable in the vertical direction. Further, there is provided in each load supporting body 2, vertical shaft 99 for change of moving direction and a roller holder 98 for holding a roller 90 revolvable around a horizontally disposed roller shaft 91. That is, the configuration is similar to that of a part of known castor which is available in the market and has freedom of motion around two axes. A compression spring 3 is installed inside a closed space formed by a concave part under the top face of the raised part 1' of the supporting base 1 and the flange part 2a of the load supporting body 2. Top end of the compression spring 3 touches the lower face of the raised part 1' of the supporting base 1 and the lower end touches the upper face of the flange part 2a of the load supporting body 2.

In the following, the operation of the first working example is elucidated referring to FIG. 1 to FIG. 4.

When a falling down force F exceeding the critical fall-down force $F_f$ as explained referring to FIG. 19 acts on the load mounted on the supporting base 1, a force Ra which is expressed by $Ra=\{(P-X)W+FH\}/P$ acts on the supporting base 1. By this force Ra, the compression spring 3 disposed between the supporting base 1 and tile load supporting body 2 is bent and compressed. And as is shown in FIG. 2, the distance between the supporting base 1 and the setting plane or floor becomes small or zero. As a result, the setting plane moves from A of FIG. 3 to C of FIG. 4. Accordingly, the angle at the center of gravity point CG, which angle is formed by the vertical line and a straight line connecting the center of gravity CG of the television set and the touching point (i.e. A or C) of the load supporting body 2 to the floor varies from $\theta1$ of FIG. 3 to $\theta2$ of FIG. 4. Therefore, with increase of the horizontal distance between the center of gravity (CG) and the touching point with the floor (A or C) varies from X of FIG. 3 to X' (X<X') of FIG. 4, the critical fall-down force $F_f$ greatly increases from $F_f=W.X/H$ to $F_f=W.X'/H$.

[Second Working Example]

Figure 5B:
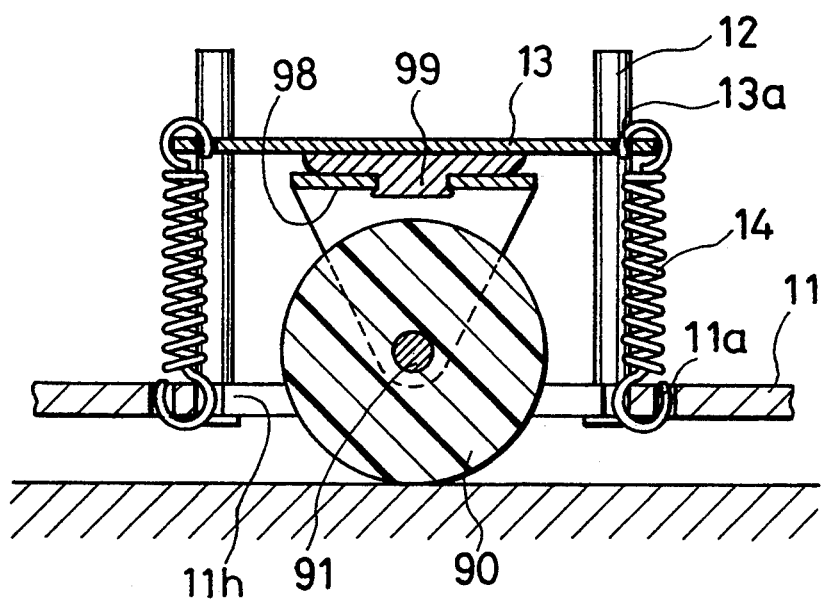
FIG. 5(B) is a cross-sectional side view of FIG. 5(A) seen from a cutting line V(B)—V(B) at the time before the action by load is applied.
Figure 6:
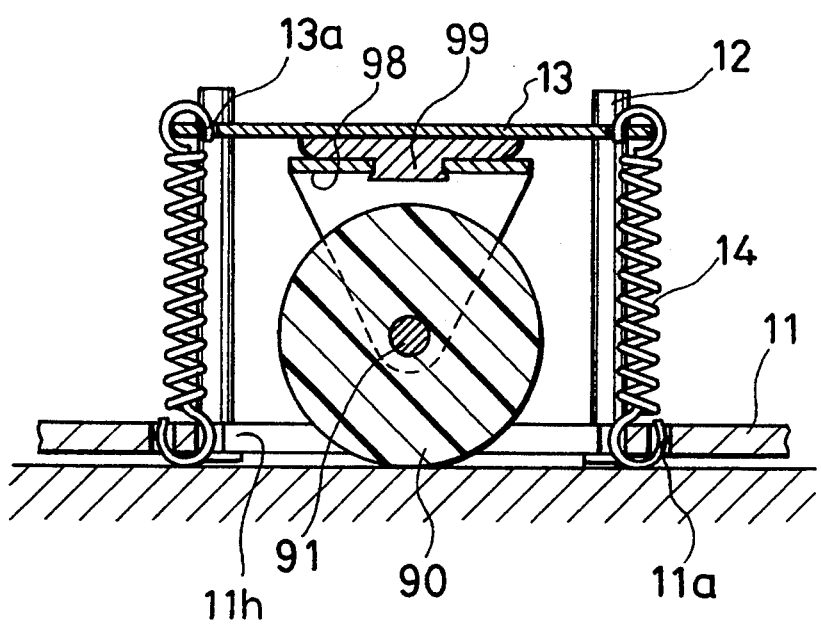

FIG. 5(A) is a plan view of a load supporting apparatus in a second working example of the present invention. FIG. 5(B) is a cross-sectional side view seen from a cutout plane V(B)—V(B) in FIG. 5(A) when no load is acting. FIG. 6 is a drawing showing tile status when the load is acted.

In FIG. 5(A) and FIG. 5(B), a supporting base 11 of rigid plate has eight small holes 11a for engaging tension springs 14 thereto and has four larger holes 11h and bears the television set thereon. Eight guide pins are fixed vertically to the supporting base 11. A load supporting body 13 having two small holes 13a for engaging tension springs 14 therewith and two guide holes for slidably engaging the guide pins 12 therethrough is provided on each larger hole 11h in a manner to be vertically movable along the guide pins 12. The tension springs 14 are fixed across the load supporting body 13 and the supporting base 11 by engaging their upper end and lower end with the small holes 13a and 11a. Further, there is provided in each load supporting body 13, vertical shaft 99 for change of moving direction and a roller holder 98 for holing a roller 90 revolvable around a horizontally disposed roller shaft 91.

In the following, the operation of the above-mentioned embodiment is explained referring to FIG. 5 and FIG. 6.

Since the tension springs 14 are provided by engaging respective lower and upper ends to holes 11a on the supporting base 11 and holes 13a on the load supporting body 13, when a falling force stronger than the critical fall-down force $F_f$ acts on the television set 101 as in FIG. 19, a force Ra which is expressed by an expression $Ra=\{(P-X)W+FH\}/P$ acts on the supporting base 11. By this force Ra, respective lower ends of the tension springs 14 are expanded downward, keeping their upper ends substantially at fixed level. Thereby the vertical distance between the supporting base 11 and the setting plane (i.e., floor) becomes smaller as shown in FIG. 6. As a result, the floor touching point moves from A of FIG. 3 to C of FIG. 4, and the horizontal distance from the vertical line passing the center of gravity to the setting point Increases from X of FIG. 3 to X' of FIG. 4 (X<X'). Therefore, the critical fall-down force increases from $F_f=W.X/H$ to $F_f=W.X'/H$.

[Third Working Example]

A third working example is shown in FIG. 7(A) and FIG. 7(B). FIG. 7(B) is a bottom view of a load supporting apparatus in a third working example of the present Invention. FIG. 7(A) is a cross-sectional side view seen from a cutout plane VII(A)—VII(A) in FIG. 7(B).

In FIG. 7(A) and FIG. 7(B), a supporting base 21 of a rigid plate has generally four raised parts 21' each with round hole at its top part and bears the television set on its flat part. Each one load supporting body 22 which is formed in a shape of an inverted cup with a flange 22a at the opening is disposed in the round hole of the raised part 21' of the supporting base 21 in a manner movable in tile vertical direction. Further, there is provided in each load supporting body 22, a vertical shaft 99 for change of moving direction and a roller holder 98 for holding a roller 90 revolvable around a horizontally disposed roller shaft 91. That is, the configuration is similar to that of a part of known castor which is available in the market and has freedom of motion around two axes. A compression spring 23 is installed inside a closed space formed by a concave part under the top face of the raised part 21' of the supporting base 21 and the flange part 22a of the load supporting body 22. Top end of the compression spring 23 touches the lower face of the raised part 21' of the supporting base 21 and the lower end touches the upper face of the flange part 22a of the load supporting body 22. A bottom lid 24 disposed under the flange part 22a is screwed in the supporting base 21 for inhibiting a getting-out or escaping of the compression spring 23 and the load supporting body 22.

The operation of the load supporting apparatus of the third example constituted as has been described above is explained below.

The compression spring 23 is first inserted into the upper part of the supporting base 21, and stored in the closed space defined by the 22a and the raised part 21'. Thereafter the bottom lid 24 is made to touch the threaded part at bottom of the supporting base 21, and the compression spring 23 is fixed compressed to a certain degree. Then by screwing tile bottom 11d 24 into the supporting base 21, the compression spring 23 is firmly stored and confined in the closed space. As a result of the above-mentioned configuration, even if, for example, only the supporting base 21 is moved in the direction to make the compression spring expand (namely in upward direction), escaping of the compression spring 23 down from the closed space never takes place. And, when the actual force acts on the supporting base 21 under this situation, the supporting base 21 is movable in the downward direction, thereby sufficiently performing the function described in the foregoing examples.

[Fourth Working Example]

FIG. 8(A) and FIG. 8(B) show the fourth working example of the present invention, wherein, for the convenience of expression, the right half of FIG. 8(A) shows the state of the load supporting device at a time of its action and the left part at resting state, by a cross-sectional side view seen from a cutout plane VIII(A)—VIII(A) in FIG. 8.(B), which is a bottom view of the same example.

As shown in FIG. 8(A) and FIG. 8(B), a supporting base 31 of a rigid plate has generally four raised parts 31' each with a round hole at its top part and bears the television set on its flat part. Each one load supporting body 32 which is formed in a shape of an inverted cup with a flange 32a at the opening is disposed in the round holes provided on the supporting base 31 in a manner movable in the vertical direction. Further, there is provided in each load supporting body 32, vertical shaft 99 for change of moving direction and a roller holder 98 for holding a roller 90 revolvable around a horizontally disposed roller shaft 91. That is, the configuration is similar to that of a part of known castor which is available in the market and has freedom of motion around two axes. A compression spring 33 is installed inside a closed space formed by a concave part under the top face of the raised part 31' of the supporting base 31 and the flange part 32a of the load supporting body 32. Top end of the compression spring 33 touches the lower face of the raised part 31' of the supporting base 31 and the lower end touches the upper face of the flange part 32a of the load supporting body 32.

At two points on the edge of the lower end of the raised part 31', there are provided respective flange-stoppers 34, each of which is held by a shaft pins 31a in a manner to be urged to horizontal by its springs 35 in normal state and may be pushed upward by an external force against the urging by the springs 35, but may not be pushed downward even a downward force be applied thereto.

On the load supporting device as elucidated referring to FIGS. 8(A) and 8(B), its action is explained below.

After putting the compression spring 33 onto the load supporting body 32 in a manner that the compression spring 33 surrounds it, the load supporting body 32 and the compression spring 33 are brought into and inserted into the concave space in the raised part 31'. At this time, the flange-stoppers 34 turn up as shown by the white arrow Rxy against the urging by the springs 35. For instance, the shaft pin 31a is fixed engaged into the supporting holes provided on the vertical wall of the load supporting body 32. When the compression spring 33 is sufficiently compressed up to such a place that the flange 32a of the load supporting body 32 leaves the flange stopper 34 (such as shown in the left-half part of the side cross-sectional view FIG. 8), the flange stoppers 34 are made to be restored in the opposite direction of the white arrow Rxy up to the normal or horizontal position by means of the restoration force of the torsion spring 35.

As a result, the compression spring 33 is safely stored and fixed inside the closed space. Thus, even when, for example, the supporting base 31 only is moved upward or in a direction to permit the compression spring 33 to expand, the compression spring 33 is confined by the flange stopper 34; and hence escape down of the compression spring 33 from the closed space never takes place. And, under this configuration, when the load acts on the supporting base 31, movement of the supporting base 31 in the downward direction is possible.

[Fifth Working Example]

FIG. 9(A) shows a plan view and FIG. 9(B) shows a cross-sectional side view, seen from a cutout plane IX-(B)—IX(B) in FIG. 9(A), of the load supporting apparatus in the fifth working example of the present invention.

In FIG. 9(A) and FIG. 9(B), supporting base 41 of a rigid plate has generally four raised parts 41', each with round hole at its top part and bears the television set on its flat part. Each one load supporting body 42 which is formed in a shape of an inverted cup with a flange 42a at the opening is disposed in the round hole of the raised part 41' of the supporting base 41 in a manner movable in the vertical direction. Further, there is provided in each load supporting body 42, a vertical shaft 99 for change of moving direction and a roller holder 98 for holding a roller 90 revolvable around a horizontally disposed roller shaft 91. That is, the configuration is similar to that of a part of known castor which is available in the market and has freedom of motion around two axes. A compression spring 43 is installed inside a closed place formed by a concave part under the top face part 41' of the supporting base 41 and the flange part 42a of the load supporting body 42. Top end of the compression spring 43 touches the lower face of the raised part 41' of the supporting base 41, and the lower end touches the upper face of the flange part 42a of the load supporting body 42. The load supporting body 42 has two folded-up strip members 42f which are formed in an arc shape in its plan view. The top edges of the folded-up strip members 42f penetrate through respective larger arc shaped slot 41a and have threaded top outer edge 42b. A stopper ring 44 having an inner-thread is coupled with the threaded top outer edges 42b of the folded-up members 42f, and the stopper ring 44 is put on the top-outer edge 41'' of the raised part 41'.

On the load supporting apparatus of FIG. 9(A) and FIG. 9(B) constituted as has been described above, its action is explained below.

After putting the compression spring 43 into the space of the folded-up shape load supporting body 42, they are inserted into the concave part of the supporting base 41. Then onto the threaded top outer edges 42b, which are disposed penetrating up through the arc shape slots 41a, the inner-threaded stopper ring-44 is thread-engaged. As a result, the compression spring 43 is safely and easily stored and confined inside the closed space. Therefore, even when, for example, only the supporting base 41 is moved downward, i.e., in a direction to compress the compression spring 43, escaping down of the compression spring 43 from the closed space never takes place. And, under this situation, when load is acted on the supporting base 41, movement of tile supporting base 41 in the downward direction is possible.

[Sixth Working Example]

FIG. 10(A) and FIG. 10(B), and also, FIG. 11(A) and FIG. 11(B), plan views and a cross-sectional side view seen from a cutout plane X(B)—X(B) in FIG. 10(A) and that from a cutout plane XI(B)—XI(B) in FIG. 11(A), of the load supporting apparatus in the sixth working example of the present invention are shown.

In FIG. 10(A) and FIG. 10(B), a supporting base 51 of a rigid plate has generally four raised parts 51' each with round hole at its top part and bears the television set on its flat part. Each one load supporting body 52 which is formed in a shape of an inverted cup with a flange 52a at the opening is disposed in the round hole of the raised part 51' of the supporting base 51 in a manner movable in the vertical direction. Further there is provided in each load supporting body 52, a vertical shaft 99 for change of moving direction and a roller holder 98 for holding a roller 90 revolvable around a horizontally disposed roller shaft 91. That is, the configuration is similar to that of a part of known castor which is available in the market and has freedom of motion around two axes. A compression spring 53 is installed inside a closed place formed by a concave part under the top face part 51' of the supporting base 51 and the flange part 52a of the load supporting body 52. Top end of the compression spring 53 touches the lower face of the raised part 51' of the supporting base 51 and the lower end touches the upper face of the flange part 52a of the load supporting body 52. Recessed engage anchors 55 are provided on plural positions of the supporting base 51 for selectively fixing to stop function of the compression spring 53. An engage lever 54 is provided rotatably to the upper face of the load supporting body 52, in a manner to be received at its both ends by the engage anchors 55 when the direction thereof is appropriate.

The action of the load supporting apparatus constituted as has been described above is explained below referring to FIG. 10(A), FIG. 10(B), FIG. 11(A) and FIG. 11(B).

In the positional relation shown in FIG. 10(A) and FIG. 10(B), the engage lever 54 positions inside the recessed engage anchors 55. In such positional status, even when a Force Ra expressed by, for example, $Ra=\{(P-X)W+FH\}/P$ acts on the supporting base 51, the upper sides of the engage lever 54 touches the lower inside surfaces of the engage anchors 55. Thereby the supporting base 51 never moves downward. And, even when a force such as lifting up only the supporting base 51 acts, the under surfaces of the engage lever 54 and the upper inside surfaces of the engage anchors 55 touch each other. And hence the relative position between the supporting base 51 and the load supporting body 52 is kept unchanged, inhibiting the escaping out of the load supporting body 52 and the compression spring 53.

On the other hand, when the positional relation is brought into such a state as shown by FIG. 11 by letting tile engage lever 54 rotate, no limiting object is present above the engage lever 54. Therefore, the engage lever 54 is free in its movement in the upward direction. That is, the load supporting body 52 can freely move in the upward direction. Therefore, If a load force Ra expressed by $Ra=\{(P-X)W+FH\}/P$ acts on the supporting base 51, the compression spring 53 disposed inside the closed space is compressed; and thereby the supporting base 51 becomes touched down to the floor. However, even in such a positional relation that a force such as lifting up only the supporting base 51 acts, the under surfaces of the engage lever 54 abut the top face of the raised part 51. Therefore, the relative position between the supporting base 51 and the load supporting body 52 is kept engaging, thereby inhibiting the escaping down of the load supporting body 52.

As is understood from the above, by changing the position of the engage lever 54, the load supporting body 52 can be adjusted between the vertically fixed mode and the spring action mode where the load supporting body 52 is movable only in the upward direction whiled fixed in the downward direction with regard to the supporting base 51. According to tills configuration, at the time of moving the TV set or the like load under sufficient care, easiness of the moving can be accomplished by fixing the load supporting body 52 in the vertical direction. And, on the other hand, increase of safety against the falling down after the time of setting the TV set is achieved by letting the supporting body movable in the vertical direction as follows: for example, when an external force which might fall down the television set 101 acts, the load supporting body 52 is retracted inside the television set 101 thereby displacing the touching point with the floor to the front end of the television set 101, resulting in stopping the falldown of the television set 101 as far as the force is under the value $F_f = W.X'/H$.

[Seventh Working Example]

FIG. 12(A) is a plan view of a seventh working example of the load supporting apparatus of the present invention and FIG. 12(B) is a cross-sectional side view seen from a cutout plane XII(B)—XII(B) in FIG. 12(A).

In FIG. 12(A) and FIG. 12(B), a supporting base 61 of a rigid plate has generally four raised parts 61' each with round hole at its top part and bears the television set on its flat part. Each one load supporting body 62 which is formed in a shape of an inverted cup with a flange 62a at the opening is disposed in the round hole of the raised part 61' of the supporting base 61 in a manner movable in the vertical direction. Further, there is provided in each load supporting body 62, a vertical shaft 99 for change of moving direction and a roller holder 98 for holding a roller 90 revolvable around a horizontally disposed roller shaft 91. That is, the configuration is similar to that of a part of known castor which is available in the market and has freedom of motion around two axes. A compression spring 63 is installed inside a closed place formed by a concave part under the top face of the raised part 61' of the supporting base 61 and the flange part 62a of the load supporting body 62. Top end of the compression spring 63 touches the lower face of the raised part 61' of the supporting base 61 and the lower end touches the upper face of the flange part 62a of the load supporting body 62. A cam-engage lever 65 which has a smoothly finished lower and side faces is held rotatably by a supporting point pin 64 attached on the top part of load supporting body 62 in an integral manner. The top part 66 has alternatingly disposed arc shaped regions of high parts 66b, low parts 66c and gradually changing slope parts 66a, and forms an end-plane cam.

On the load supporting device constituted as has been described above, its action is explained below referring to FIG. 12(A) and 12(B), as well as FIG. 13(A) and FIG. 13(B).

In the positional relation shown in FIG. 12(A) and FIG. 12(B) wherein the cam-engage lever 65 is on the lower parts 66c, the upper motion of the supporting base 61 with respect to the load supporting body 62 is made only by the compression spring 63, which is disposed inside the closed space formed by the concave or lower part of the supporting base 61 and the flange part of the load supporting body 62. Therefore, if a load force Ra expressed by, for example, $Ra=\{(P-X)W+FH\}/P$ acts on the supporting base 61, the compression spring 63 is compressed, and then the supporting base 61 becomes to touch the floor. That is, when taking the supporting base 61 as the reference, the load supporting body 62 becomes free to move upward. And, under such the positional relation, even when a force such as lifting up the supporting base 61 only is acted thereto, the relative position between the supporting base 61 and the load supporting body 62 is kept unchanged, because the under surface of the cam-engage lever 65 and tile upper edge of the raised parts 61' of the supporting base 61 touched each other as shown in FIG. 12(B).

On the other hand, when letting the cam-engage lever 65 rotate to such position that the cam-engage lever 65 comes at the high parts 66b of the end-plane cam 66 as shown in FIG. 13(A) and in FIG. 13(B), the cam-engage lever 65 moves upward along the intermediate gradual climbing slopes 66a disposed between the low part 66c and the high parts 66b on the end-plane cam 66 provided on the raised part 61' of the supporting base 61. As a result, the supporting point pin 64 which touches with the upper surface of the cam-engage lever 65 and also the load supporting body 62 which is fixed to the supporting point pin 64 move upward. By designing that the lifting amount h (level difference between the high parts 66b and the low parts 66c) of the end-plane cam 66 formed on the upper part of the supporting base 61 is taken to be equal to or more than the distance D between the supporting base 61 and the floor, the load supporting body 62 is retracted up inside the supporting base 61 when the cam-engage lever 65 reaches the high part 66b on the upper part of the supporting base 61. And, under such the positional relation, even when a force such as lifting up only the supporting base 61 is acted, tile relative positions between the supporting base 61 and the load supporting body 62 is kept unchanged because the under surface of the cam-engage lever 65 and the high parts 66b of the upper side surface of the top part 66 of the supporting base 61 touch to each other.

From the above configuration, by setting the position of the cam-engage lever 65 to the high parts 66b on the upper part of the supporting base 61, the load supporting body 62 is retracted inside the supporting base 61. Thereby, even when a force F that may fall down the television set 101 shown in FIG. 19 acts, the whole bottom area becomes serving to resist against the fall-down. This improves the capability against the fall-down accident.

Next by letting the position of the cam-engage lever 65 rotate to the low parts 66c of the above-mentioned end-plane cam 66, the load supporting body 62 can be made fixed with regard to a downward motion while movable with regard to the upward motion. Thereby the television set can be moved easily. And that, when a fall-down force F acts, the load supporting body 62 is retracted inside the television set 101, and the touching point to the floor moves to the most front part of the television set 101. This results in stopping of the fall-down of the television set 101 until the outside force F reaches to $F_f=W.X'/H$.

[Eighth Working Example]

FIG. 14(A) is a plan view of the load supporting apparatus in the eighth working example of the present invention, and FIG. 14(B) is a cross-sectional side view of the apparatus at small load state seen from a cutout plane XIV(B)—XIV(B) in FIG. 14(A). FIG.15 is a cross sectional side view of the apparatus at a large load state.

In FIG. 14(A) and FIG. 14(B): numeral 71 is a load supporting base on which the television set is borne; numeral 72 is a roller which receives the load; numeral 73 is a roller supporting lever on which the roller 72 is borne rotatably; numeral 74 is a supporting fulcrum pin provided horizontally penetrating through a supporting pole 71a provided on the load supporting base 71, and the fulcrum pin 74 serves as a shaft for rotatably supports the roller supporting lever 73; numeral 75 is a tension spring which is fixed at one end to a part of the supporting base 71 and gives the roller supporting lever 73 a force to press the roller 72 to touch the floor; numeral 76 is a shaft of the roller 72 rotatably bearing the roller 72 to the roller supporting lever 73.

On the load supporting apparatus constituted as has been described above, its action is explained below referring to FIG. 3, FIG. 4, FIG. 14(A), FIG. 14(B) and FIG. 15.

When the large horizontal external force F in FIG. 15 acts on the supporting base 71 and it exceeds the critical fall-down force $F_f$, a vertical reaction force Ra expressed by $Ra=\{(P-X)W+F_f.H\}/P$ acts on the contacting point of the roller 72. By this reaction force Ra, the roller supporting lever 73 turns in the counterclock direction shown by the white arrow Rxy around the supporting point pin 74 attached to the supporting pole 71a of the load supporting body 71. At this time, by setting the tension of the tension spring 75 which gives a force of a certain value in the opposite direction to the white arrow Rxy to the roller supporting lever 73, the roller 72 can be retracted up in the supporting base 71 when the load Ra is acted.

As a result, the touching point moves from A of FIG. 3 to C of FIG. 4, and hence the horizontal distance from the center of gravity CG varies from X of FIG. 3 to X' (X<X') of FIG. 4. And the critical fall-down force $F_f$ increases from $F_f=W.X/H$ to $F_f=W.X'/H$.

And, by removing the above-mentioned fall-down force F, the relative positional relation between the roller 72 and the supporting base 71 returns to the initial state by the force acted by the tension spring 75.

[Ninth Working Example]

FIG. 16(A) is a plan view of the load supporting apparatus in the ninth working example of the present invention, and FIG. 16(B) is a cross-sectional side view seen from a cutout plane XVI(B)—XVI(B) in FIG. 16(A).

In FIG. 16(A) and FIG. 16(B): Numeral 81 designates a supporting base on which the television set is borne; 82 and 83 designate a pair of rods for receiving the force based on the load; the force based on the load is transmitted through pistons 82a and 83a to fluid 87 held in a cylinder 84 as well as in a cylinder 85. Respective pistons 82a and 83a are provided with compression springs 82b and 83b which give predetermined forces to the pistons 82a and 83a to keep the pistons 82a and 82b at midways of the cylinders 84 and 85; fluid ports 84a, 84b, 85a, and 85b are provided respectively to connect to the under-the-piston space and above-the-piston space in the cylinder 84 and the under-the-piston space and the above-the-piston space in the cylinder 85; the ports 84a is connected to the port 85b, while the port 84b is connected to the port 85a, thereby to link the fluid 87 crosswisely. Piston rings 86 and 86' are provided around the pistons 82a, 83a and around the rod 82, 83, so as to seal the cylinders 84 and 85, respectively.

On the load supporting device constituted as has been described above, its action is explained below referring to FIG. 17 besides FIGS. 16(A) and 16(B).

FIG. 16(A) and (B) show a state in which no other external force than the gravity acts on the television set, and hence its flat supporting base 81 is held horizontal, namely in parallel to the floor. This is realized by making equilibrium of the compression spring 82b and the compression spring 83b. Under this situation, when, for example, a fall-down force F shown in FIG. 19 acts, a reaction force Ra acting on the front castor of the supporting base 81 increases, and the piston 82a moves upward with respect to the cylinder 84 in the front side. By the above action, fluid 87 held in the part above the piston 82a in the cylinder 84 flows out and into the under the piston space of the cylinder 85 through the ports 84b and 85a, 85b. By this flowing-in fluid 87, the piston 83a in the cylinder 85 is pushed upward. Therefore, the fluid 87 in the above-the-piston space of the cylinder 85 flows out and into the under-the-piston space of the cylinder 84 through the ports 85b and 84a. By designing in a manner that the volumes and sectional areas of the cylinder 84 and cylinder 85 are the same, the supporting base 81 moves downward accurately keeping its horizontal posture, thereby keeping its posture's parallelism with respect to the floor. In FIG. 17, the state that the supporting base 81 is settled down stably is shown.

Although the present invention has been described in terms of the presently preferred embodiments, it is to be understood that such disclosure is not to be interpreted as limiting. Various alterations and modifications will no doubt become apparent to those skilled in the art after having read the above disclosure. Accordingly, it is intended that the appended claims be Interpreted as covering all alterations and modifications as fall within the true spirit and scope of the invention.

What is claimed is:

1. A load supporting apparatus for supporting an audiovisual assembly comprising:
   a supporting base,
   plural load supporting bodies mounted to said supporting base so that said supporting base is vertically movable with respect to the support bodies, and
   resilient members provided between each of said load supporting bodies and said supporting base, which permit the supporting base to move vertically with respect to the supporting bodies against a resilient force of the resilient members and, when a force which acts on said supporting base exceeds a predetermined amount, permit an edge of said supporting base to come into contact with a surface on which the load supporting apparatus is disposed, thereby increasing an angle formed between a vertical line through a center of gravity of said apparatus and an oblique straight line connecting the center of gravity of the audiovisual assembly and a forward most point of contact of said load supporting apparatus.

2. A load supporting apparatus in accordance with claim 1 wherein
   said resilient members are compression springs each contained in a closed space formed by a concave part formed under raised parts of said supporting base and over flange parts of each said load supporting body, touching at an upper end of each spring is inner lower faces of the concave part of said raised parts, and touching at a lower end of each spring is upper faces of the said flange parts of the load supporting body.

3. A load supporting apparatus in accordance with claim 2 which further comprises:
   bottom lids which touch under faces of said flange parts of said load supporting body and have threaded part for engaging screw parts provided at bottom corners of said raised parts of said supporting base.

4. A load supporting apparatus in accordance with claim 2, which further comprises:
   flange stoppers which are movably mounted on corners at a bottom of said raised parts of said supporting base in a manner to permit upward-passings of said compression springs and said flange parts but to inhibit downward passings of the same, said flange stoppers being spring hinges which normally take horizontal posture to receive said flange parts thereon, rotated upward by pushing, but never rotate downward beyond horizontal.

5. A load supporting apparatus in accordance with claim 2 which further comprises:
   plural fold-up strips which are connected to an end of said flange parts, lead above top parts of said raised parts and have threads at their top edge parts and a nut which is fastened to said threads and overriding said top parts of said raised parts, thereby to prevent escape down of said compression spring and said load supporting bodies.

6. A load supporting apparatus in accordance with claim 2 which further comprises:
   engage levers mounted rotatably on top of said supporting bodies and engage anchors which are provided on top part of said supporting base and have offset recesses thereunder for engaging ends of said engage levers therein.

7. A load supporting apparatus in accordance with claim 2 further comprising:
   cam-engage levers rotatably mounted on top of said load supporting bodies and
   end plane cam provided on top edges of said raised part and having alternately disposed high parts and low parts for receiving engaging parts of said cam-engage levers, thereby to limit downward motion of said load supporting bodies and retract up said load supporting bodies when said cam-engage levers are received on said high parts.

8. A load supporting apparatus for supporting an audiovisual assembly comprising:
   a supporting base,
   guide pins fixed vertically on said supporting base,
   plural load supporting bodies coupled to said guide pins so that said supporting base and said guide pins mounted thereto are vertically movable relative to the load supporting bodies, and
   tension springs whose ends are engaged to engaging means on said supporting base and to engaging means on said load supporting bodies.

9. A load supporting apparatus for supporting an audiovisual assembly comprising:
   a supporting base,
   roller supporting shafts fixed horizontally to supporting parts provided on said supporting base, roller supporting members including roller shafts rotatably mounted to said roller supporting shafts, rollers borne by said roller shafts, and resilient means provided between said roller supporting members and said supporting parts in a manner to give a predetermined downward force to said rollers in relation to said supporting base.

10. A load supporting apparatus for supporting an audiovisual assembly comprising:

a supporting base, at least two cylinders provided in said supporting base, each cylinder being divided into two parts by a slidable piston and each divided part containing fluid inside, said divided parts being connected through respective ports in a manner that an upper divided part of one cylinder being connected to a lower divided part of the other cylinder and vice versa, said pistons being linked to load supporting bodies, and being urged by resilient members to keep each of said at least two pistons at substantially an intermediate in said respective cylinder thereby holding said supporting base horizontal in a normal state wherein no external falling-down force is applied to said audiovisual assembly.

* * * * *